(12) United States Patent
Katayama et al.

(10) Patent No.: US 8,675,253 B2
(45) Date of Patent: Mar. 18, 2014

(54) COLOR SELECTION ASSISTING METHOD, IMAGE PROCESSING METHOD, COLOR SELECTION ASSISTING APPARATUS, IMAGE PROCESSING APPARATUS, AND RECORDING MEDIUM

(75) Inventors: Takeshi Katayama, Tokyo (JP); Eiji Teraue, Tokyo (JP); Junko Iga, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 259 days.

(21) Appl. No.: 13/221,451

(22) Filed: Aug. 30, 2011

(65) Prior Publication Data
US 2012/0050770 A1    Mar. 1, 2012

(30) Foreign Application Priority Data
Aug. 31, 2010  (JP) ................... 2010-193997

(51) Int. Cl.
*G06F 15/00*  (2006.01)
*G06K 1/00*  (2006.01)
*H04N 1/60*  (2006.01)
*G06F 3/12*  (2006.01)

(52) U.S. Cl.
USPC .......................................... 358/1.9; 358/1.13

(58) Field of Classification Search
None
See application file for complete search history.

(56) References Cited

U.S. PATENT DOCUMENTS

| 6,211,973 B1 * | 4/2001 | Takemoto ............... 358/515 |
| 7,239,402 B2 | 7/2007 | Soler et al. |
| 7,898,704 B2 * | 3/2011 | Doi et al. ................. 358/504 |

FOREIGN PATENT DOCUMENTS

| JP | 08-287215 | 11/1996 |
| JP | 2000-217007 A | 8/2000 |
| JP | 2002-351447 A | 12/2002 |
| JP | 2003-134349 A | 5/2003 |
| JP | 2009-118419 | 5/2009 |

* cited by examiner

*Primary Examiner* — Douglas Tran
(74) *Attorney, Agent, or Firm* — Birch, Stewart, Kolasch & Birch, LLP

(57) ABSTRACT

A chart simulating image is displayed, which simulates the layout of color patches on a color chart. Color bars, which match the tendency of color changes depending on the layout of the color patches, also are displayed together with the chart simulating image. Mark images, which are indicative of a color presentation range according to the color patches in a color space represented by the gradation images, also are displayed together with the color bars.

17 Claims, 13 Drawing Sheets

| | (1') | (0') | (-1') | (1) | (0) | (-1) | (1") | (0") | (-1") |
|---|---|---|---|---|---|---|---|---|---|
| (1) | +1 | +1 | +1 | 0 | 0 | 0 | -1 | -1 | -1 |
| | +1 | 0 | -1 | +1 | 0 | -1 | +1 | 0 | -1 |
| | +1 | +1 | +1 | +1 | +1 | +1 | +1 | +1 | +1 |
| (0) | +1 | +1 | +1 | 0 | 0 | 0 | -1 | -1 | -1 |
| | +1 | 0 | -1 | +1 | 0 | -1 | +1 | 0 | -1 |
| | 0 | 0 | 0 | 0 | 0 | 0 | 0 | 0 | 0 |
| (-1) | +1 | +1 | +1 | 0 | 0 | 0 | -1 | -1 | -1 |
| | +1 | 0 | -1 | +1 | 0 | -1 | +1 | 0 | -1 |
| | -1 | -1 | -1 | -1 | -1 | -1 | -1 | -1 | -1 |

«COLOR SELECTION ASSISTING METHOD, IMAGE PROCESSING METHOD, COLOR SELECTION ASSISTING APPARATUS, IMAGE PROCESSING APPARATUS, AND RECORDING MEDIUM»

CROSS-REFERENCE TO RELATED APPLICATION

This application is based upon and claims the benefit of priority from Japanese Patent Application No. 2010-193997 filed on Aug. 31, 2010, of which the contents are incorporated herein by reference.

BACKGROUND OF THE INVENTION

1. Field of the Invention

The present invention relates to a color selection assisting method, an image processing method, a color selection assisting apparatus, an image processing apparatus, and a recording medium having a program recorded therein for determining a standard color, printing a color chart that has a plurality of color patches including neighboring colors of the standard color, and thereafter allowing an operator to select from the color chart at least one of the color patches, which has a color close to a designated color reproduced on a print.

2. Description of the Related Art

With significant advances in inkjet technology in recent years, it is becoming possible for inkjet printers to produce large color prints of high quality at high speeds. Inkjet printers are not only popular for private or home use, but also are widely used for public use or in commercial applications nowadays. Inkjet printers make it possible to print on POP (Point Of Purchase) posters, wall posters, large-size mediums such as outdoor advertisements and billboards, roll mediums, and thick hard mediums.

Since advertisement prints are expected to be effective to arouse consumers' motivation to buy advertised products through visual sensation, the finish of colors in such prints is of particular importance. Heretofore, there have been disclosed various color matching technologies, such as a method of generating an ICC (International Color Consortium) profile, a method of adjusting a spot color (hereinafter referred to as a "designated color"), etc., as print color managing means.

A method of adjusting a designated color includes making fine adjustments of the color of an area of interest in a color image in order to bring the color into substantial conformity with a designated color to be reproduced on a print, using color samples such as color chips, etc. More specifically, actual color values of a color sample and color values for reproducing the designated color with a printing machine are acquired, and a print color is corrected based on the difference between the acquired color values.

Japanese Laid-Open Patent Publication No. 2003-134349 (paragraph [0009], FIG. 4) discloses a method of reading a color sample with a scanner device, printing a plurality of variations of the color sample generated from the read data, and selecting a particular color from the printed variations.

Japanese Laid-Open Patent Publication No. 2000-217007 (paragraphs [0034] through [0036], FIGS. 4 and 5) discloses a method of setting a display device to display a designated color on a screen image (display window), visually observing a printed color chart, selecting a color closest to the designated color from color patches provided in twenty-seven colors, and entering a number of the selected color through the screen image. The patent publication states that it is possible to cause the designated color displayed on the display device and a color printed by a printing machine to strictly approximate to each other.

Japanese Laid-Open Patent Publication No. 2002-351447 (paragraph [0004], FIGS. 1 and 2) discloses a system for selecting a desired color using in combination a display device and a printing machine. More specifically, a color wheel (a succession of colors) is displayed on a first screen image of the display device, thereby allowing the operator to select colors in general. Then, a window (discrete colors) is displayed on a second screen image of the display device, in order to allow the operator to select an accurate color based on a print produced by the printing machine.

SUMMARY OF THE INVENTION

In order to strictly reproduce a designated color on a print according to the methods of the related art discussed above, it is necessary to repeat steps of printing a color chart and selecting a color patch. In repeating such steps, it is efficient to recognize at all times a color range (also referred to as a "color search range"), which includes therein a color that is closest to the designated color, and to gradually reduce the color search range, or stated otherwise, to narrow down the number of colors to choose from.

As the color intervals between color patches are reduced, the operator finds it more difficult to identify, with good reproducibility, an approximation between the color patches and the color samples. Therefore, even the same operator may make contradictory selections if the operator performs the same selection process using color charts printed at different times. Since the operator needs to verify the adequacy of a preceding selection process, man-hours are consumed wastefully to print a color chart based on a temporarily expanded color search range, for example. As the number of reprinted color charts increases, the operator frequently feels anxious about whether the operator can really arrive at a color that is close to the designated color. In particular, if the operator lacks sufficient skill, the operator is likely to feel doubtful concerning whether the presently selected color is appropriate or not.

An object of the present invention is to provide a color selection assisting method, an image processing method, a color selection assisting apparatus, an image processing apparatus, and a recording medium having a program recorded therein, which enable an operator to efficiently select a color that is close to a designated color, while confirming the adequacy of a present selection process.

According to the present invention, there is provided a color selection assisting method comprising the steps of determining a standard color, printing a color chart that has a plurality of color patches including neighboring colors of the standard color, and thereafter allowing an operator to select from the color chart at least one of the color patches, which has a color close to a designated color reproduced on a print.

The color selection assisting method comprises a display step of displaying a chart simulating image, which simulates a layout of the color patches on the color chart, and an auxiliary display step of displaying, together with the chart simulating image, a gradation image that matches tendency of a color change depending on the layout of the color patches, and displaying, together with the gradation image, a mark image, which is indicative of a color presentation range according to the color patches in a color space represented by the gradation image.

If the steps of determining the standard color, printing the color chart, and allowing the operator to select at least one of the color patches that has the color close to the designated color are successively carried out at least once, then the auxiliary display step should preferably include a step of displaying, together with the gradation image, a history mark image, which is indicative of the color presentation range depending on respective color charts that were printed in the past.

The auxiliary display step should preferably include a step of displaying history mark images that are indicative of the color presentation range according to a time sequence in which each of the color charts was printed.

The color selection assisting method should preferably further comprise a display selecting step of making a selection as to whether or not the mark image is to be displayed in the auxiliary display step.

The auxiliary display step should preferably include a step of changing and displaying at least one of a size, a color gradient, and a color range of the gradation image depending on the presentation range.

The color selection assisting method should preferably further comprise a determining step of determining whether or not the presentation range exceeds a color range of the gradation image, and an indicating step of indicating that the presentation range exceeds the color range of the gradation image if the presentation range is judged as exceeding the color range of the gradation image.

The color selection assisting method should preferably further comprise a changing step of changing the number of the color patches on the color chart or a color interval between the color patches on the color chart. Also, the display step includes a step of updating and displaying the chart simulating image depending on the changed number or the changed color interval.

The mark image should preferably be indicative of at least one of an upper limit value, a lower limit value, and a central value of the presentation range.

The gradation image should preferably comprise at least three color bars.

The color selection assisting method should preferably further comprise a color value acquiring step of acquiring a selected color value representing a color value depending on one of the color patches, which is selected as representing a color closest to the designated color.

According to the present invention, there also is provided an image processing method comprising a printing step of determining a standard color and printing a color chart that has a plurality of color patches including neighboring colors of the standard color, a display step of displaying a chart simulating image, which simulates a layout of the color patches on the color chart, an auxiliary display step of displaying, together with the chart simulating image, a gradation image that matches tendency of a color change depending on the layout of the color patches, and displaying, together with the gradation image, a mark image, which is indicative of a color presentation range according to the color patches in a color space represented by the gradation image, a first color value acquiring step of acquiring, as a first color value, a color value depending on one of the color patches, which is selected as representing a color closest to a designated color reproduced on a print, a second color value acquiring step of acquiring a color value of the designated color as a second color value, and a print color adjusting step of adjusting a color of the print, which is printed based on the first color value and the second color value that are acquired.

According to the present invention, there is further provided a color selection assisting apparatus for determining a standard color, printing a color chart that has a plurality of color patches including neighboring colors of the standard color, and allowing an operator to select from the color chart at least one of the color patches, which has a color close to a designated color reproduced on a print.

The color selection assisting apparatus comprises a simulative image generator for generating a chart simulating image, which simulates a layout of the color patches on the color chart, a gradation image generator for generating a gradation image, which matches tendency of a color change depending on the layout of the color patches, and an image superimposer for placing the chart simulating image generated by the simulative image generator and the gradation image generated by the gradation image generator together with each other, and superimposing a mark image, which is indicative of a color presentation range according to the color patches in a color space represented by the gradation image, on the gradation image.

The color selection assisting apparatus preferably further comprises a display unit for displaying the chart simulating image, the gradation image, and the mark image that are placed by the image superimposer.

The color selection assisting apparatus preferably further comprises a color value acquirer for acquiring a color value of one of the color patches, which is selected as representing a color closest to the designated color, as a selected color value, wherein the display unit displays color information of the selected color value that is acquired by the color value acquirer.

The color selection assisting apparatus preferably further comprises a data converter for converting the selected color value into device-dependent data for a printing machine that prints the print, using a profile of the printing machine, wherein the display unit displays the device-dependent data produced by the data converter.

According to the present invention, there is further provided an image processing apparatus comprising a standard color determiner for determining a standard color, a simulative image generator for generating a chart simulating image, which simulates a layout of a plurality of color patches on a color chart, the color chart having the color patches that include neighboring colors of the standard color determined by the standard color determiner, a gradation image generator for generating a gradation image that matches tendency of a color change depending on the layout of the color patches, an image superimposer for placing the chart simulating image generated by the simulative image generator and the gradation image generated by the gradation image generator together with each other, and superimposing a mark image, which is indicative of a color presentation range according to the color patches in a color space represented by the gradation image, on the gradation image, a first color value acquirer for acquiring, as a first color value, a color value depending on one of the color patches, which is selected as representing a color closest to a designated color reproduced on a print, a second color value acquirer for acquiring a color value of the designated color as a second color value, and a print color adjuster for adjusting the color of the print that is printed based on the first color value acquired by the first color value acquirer and the second color value acquired by the second color value acquirer.

According to the present invention, there is also provided a recording medium storing therein a program for determining a standard color and allowing an operator to select, from a color chart that has a plurality of color patches including neighboring colors of the standard color, at least one of the color patches which has a color close to a designated color reproduced on a print, the program enabling a computer to function as a simulative image generator for generating a chart simulating image, which simulates a layout of the color patches on the color chart, a gradation image generator for generating a gradation image that matches tendency of a color change depending on the layout of the color patches, and an image superimposer for placing the chart simulating image generated by the simulative image generator and the gradation image generated by the gradation image generator together with each other, and superimposing a mark image, which is indicative of a color presentation range according to the color patches in a color space represented by the gradation image, on the gradation image.

With the color selection assisting method, the image processing method, the color selection assisting apparatus, the image processing apparatus, and the recording medium having a program recorded therein according to the present invention, a chart simulating image, which simulates the layout of color patches on a color chart, is displayed, and a gradation image that matches the tendency of a color change depending on the layout of the color patches also is displayed together with the chart simulating image. A mark image, which is indicative of a color presentation range according to the color patch in a color space represented by the gradation image, is displayed together with the gradation image. The operator is able to visually recognize a color search range on the present color chart, based on the relative positional relationship between the gradation image and the mark image. Since the chart simulating image, which simulates the color chart, also is displayed, the operator can intuitively grasp the color search range, even if the operator lacks knowledge concerning the art of printing. Consequently, regardless of the skill of the operator, the operator can perform a color adjusting process while confirming the adequacy of present operational details. Stated otherwise, the operator can efficiently select a color that is close to the designated color in a suitable color adjusting process, without wasteful consumption of man hours.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A color selection assisting method according to a preferred embodiment of the present invention, in relation to a color selection assisting apparatus (or an image processing apparatus) and a printing system for carrying out the color selection assisting method, will be described in detail below with reference to the accompanying drawings.

Figure 1:
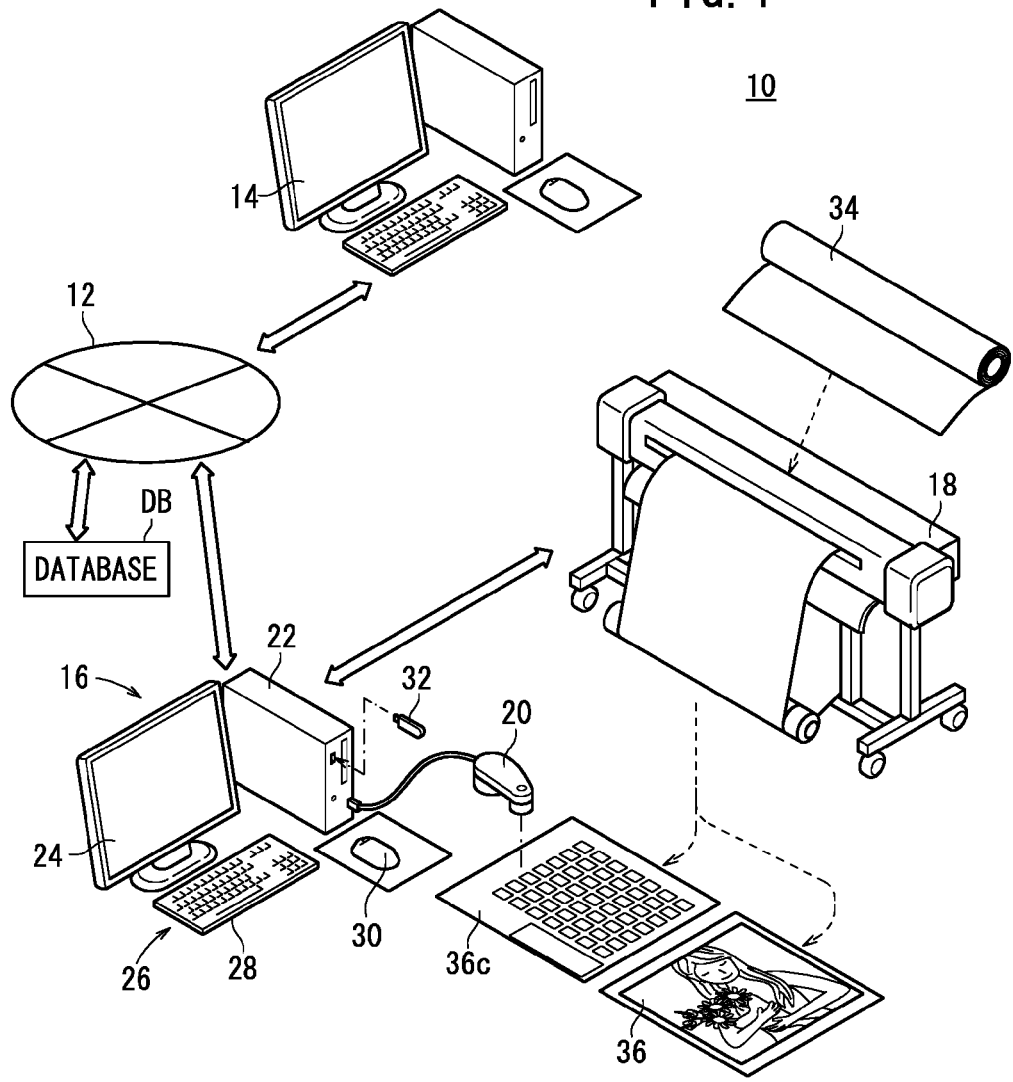
FIG. 1 is a perspective view of a printing system incorporating an image processing apparatus according to an embodiment of the present invention.

FIG. 1 is a perspective view of a printing system 10 incorporating an image processing apparatus 16 according to an embodiment of the present invention.

As shown in FIG. 1, the printing system 10 basically comprises a network 12, an editing apparatus 14, an image processing apparatus (color selection assisting apparatus) 16, a printing machine 18, and a colorimeter 20.

The network 12 is constructed according to communication standards such as Ethernet® or the like. The editing apparatus 14 and the image processing apparatus 16 are connected to each other and also to a database DB by a wired or wireless link over the network 12.

The editing apparatus 14 is capable of editing an arrangement of color images made up of characters, figures, pictures, photos, etc., on each of pages to be printed. The editing apparatus 14 generates electronic manuscripts (print data) in a page description language (hereinafter referred to as "PDL"), e.g., 8-bit image data in color channels of four colors (C, M, Y, K) or three colors (R, G, B).

PDL refers to a language, which is descriptive of image information including format information, positional information, color information (including density information), etc., of characters, figures, etc., in a "page" that serves as an output unit for printing, displaying, or the like. Known types of PDL include PDF (Portable Document Format according to ISO32000-1:2008), PostScript® of AdobeSystems, and XPS (XML Paper Specification).

The image processing apparatus 16 functions to convert an electronic manuscript described by PDL into an electronic manuscript represented by raster data in a raster format, e.g., bitmap image data or TIFF data, perform desired image processing, e.g., a color conversion process, an image scaling process, an image arranging process, etc., on the raster data, convert the processed raster data into print control signals that match the printing machine 18, and send print control signals to the printing machine 18.

The image processing apparatus 16 comprises a main unit 22 including a CPU, a memory, etc., a display device (display unit) 24 for displaying color images, and an input device 26 serving as an input unit including a keyboard 28 and a mouse 30 for entering various data and operation commands. The mouse 30, which serves as a pointing device, may be replaced with a track pad or a track ball.

A portable memory 32 for recording electronic data therein and deleting electronic data therefrom, and the colorimeter 20 are connected to the main unit 22 of the image processing apparatus 16.

The printing machine 18 comprises an inkjet printing apparatus for producing a color image based on a combination of standard inks of colors C, M, Y, K (process colors), and optional inks of light colors such as LC, LM, etc., and W (white). The printing machine 18 controls the propulsion of inks onto a print medium 34 (rolled non-printed medium in FIG. 1), based on a print control signal received from an external apparatus, e.g., the image processing apparatus 16, so as to print a color image on the print medium 34, thereby producing a print 36, which may include a color chart 36*c*.

The print medium 34 may comprise a paper medium such as synthetic paper, thick paper, aluminum-evaporated paper, or the like, a resin medium comprising vinyl chloride, PET, or the like, or tarpaulin, or the like.

The colorimeter 20 measures color values of an object to be measured, depending on a prescribed colorimetric processing command. Color values refer not only to device-independent data, such as tristimulus values X, Y, Z, the coordinates L*, a*, b* of a uniform color space, etc., but also to a distribution of optical physical quantities with respect to wavelengths (hereinafter referred to as "spectral data"). Spectral data may represent a spectral radiance distribution, a spectral sensitivity distribution, spectral reflectivity, or spectral transmittance, for example.

The database DB comprises a database server for managing data such as job tickets of electronic manuscripts, e.g., JDF (Job Definition Format) files, color sample data, target profiles, or profiles suitable for respective print mediums 34.

Figures 2A, 2B:
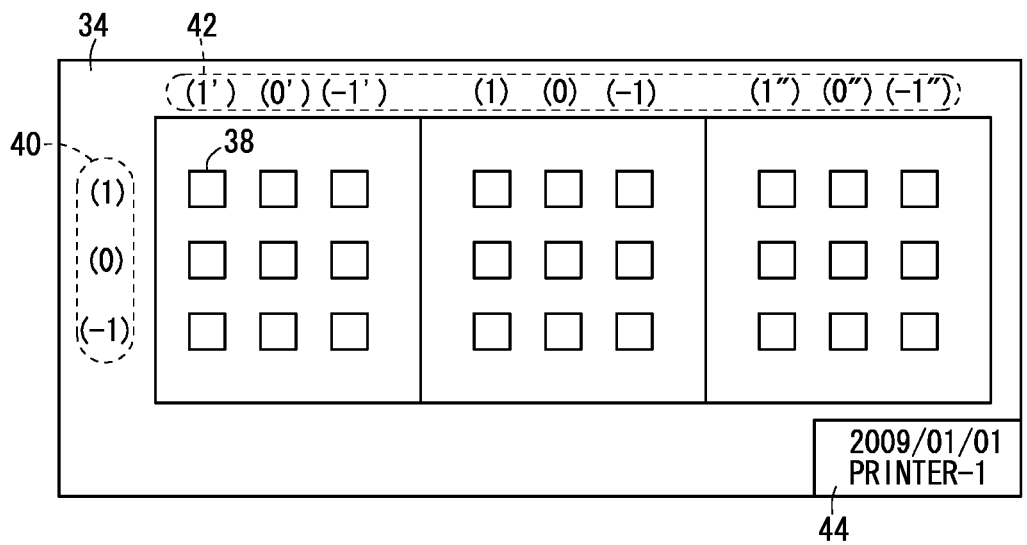
FIG. 2A is a schematic front elevational view of a color chart shown in FIG. 1.
FIG. 2B is a table showing a design example of color values of respective color patches of the color chart shown in FIG. 2A.

FIG. 2A is a schematic front elevational view of the color chart 36*c*.

As shown in FIG. 2A, the color chart 36*c* comprises twenty-seven color patches 38 of different colors, which are substantially identical in shape and arranged in rows and columns, a sequence of row numbers 40 (identification information) and a sequence of column numbers 42 (identification information) for identifying positions of the color patches 38 along directions of the rows and columns, and print information 44 representing various items of information for identifying printing conditions for printing the color chart 36*c*, all of which are printed on the print medium 34.

The color patches 38 are arranged in a two-dimensional pattern on the color chart 36*c*, i.e., in three matrices disposed in respective left, central, and right areas of the print medium 34, each of the matrices including 9 color patches arranged in three horizontal rows and three vertical columns and spaced by given intervals. Colors of the respective color patches 38 are set to given values in a range of signal levels of C, M, Y, K values (a percentage range from 0% to 100% or an 8-bit gradation range from 0 to 255).

The row numbers 40 are represented by (1), (0), (−1), respectively, arranged successively from above and positioned in alignment with and to the left of the respective rows of color patches 38. The column numbers 42 are represented by (1'), . . . , (−1''), respectively, arranged successively from the left and positioned in alignment with and above the respective columns of color patches 38.

The print information 44 represents a type of printing machine 18, a serial number or registration name thereof, a print mode, a type of print medium 34, a print date, etc.

FIG. 2B is a table showing a design example of color values of respective color patches 38 of the color chart 36*c* shown in FIG. 2A.

For arranging color patches 38 in a two-dimensional pattern, colors of the color patches 38 are changed gradually depending on positions of the color patches 38. For example, using three variables (L*, a*, b*) of a uniform color space CIELAB, color values of each color patch 38 are determined according to the following equations (1) through (3):

$$L^*_i = L^*_0 + \Delta L^* \times i \text{ (where } i \text{ is an integer)} \quad (1)$$

$$a^*_j = a^*_0 + \Delta a^* \times j \text{ (where } j \text{ is an integer)} \quad (2)$$

$$b^*_k = b^*_0 + \Delta b^* \times k \text{ (where } k \text{ is an integer)} \quad (3)$$

Numbers added to the left and top of the table shown in FIG. 2B correspond respectively to the row numbers 40 and the column numbers 42. The table includes a matrix of cells, each showing three numerical values in upper, middle, and lower levels. The three numerical values are represented by values of "i", "j", "k" included in the respective equations (1), (2), (3) shown above.

The color regions formed by the respective equations (1), (2), (3) will hereinafter be referred to as color presentation ranges, which are based on the color patches 38 (also referred to as "presentation ranges"). For example, presentation ranges shown in FIGS. 2A and 2B, corresponding to regions of a rectangular parallelepiped formed by 8 vertices, are represented by $(L^*_0+\Delta L^*, a^*_0+\Delta a^*, b^*_0+\Delta b^*)$, $(L^*_0+\Delta L^*, a^*_0+\Delta a^*, b^*_0-\Delta b^*)$, $(L^*_0+\Delta L^*, a^*_0-\Delta a^*, b^*_0+\Delta b^*)$, $(L^*_0+\Delta L^*, a^*_0-\Delta a^*, b^*_0-\Delta b^*)$, $(L^*_0-\Delta L^*, a^*_0+\Delta a^*, b^*_0+\Delta b^*)$, $(L^*_0-\Delta L^*, a^*_0+\Delta a^*, b^*_0-\Delta b^*)$, $(L^*_0-\Delta L^*, a^*_0-\Delta a^*, b^*_0+\Delta b^*)$, and $(L^*_0-\Delta L^*, L^*_0-\Delta a^*, b^*_0-\Delta b^*)$.

A typical color (e.g., central value $L^*_0$, $a^*_0$, $b^*_0$) of the color patches 38 will be referred to as a "standard color". The color difference ($\Delta L^*$, $\Delta a^*$, $\Delta b^*$) between adjacent color patches 38 will be referred to as a "color interval". The number of color patches 38 per matrix side (three in FIG. 2A) will be referred to as a "patch count". The associative relationship between positions of the color patches 38 and the color values shown in FIG. 2B will be referred to as a "color association". The standard color, the color interval, the patch count, and the color association of the color chart 36*c* will collectively be referred to as "color chart conditions".

Figure 3:
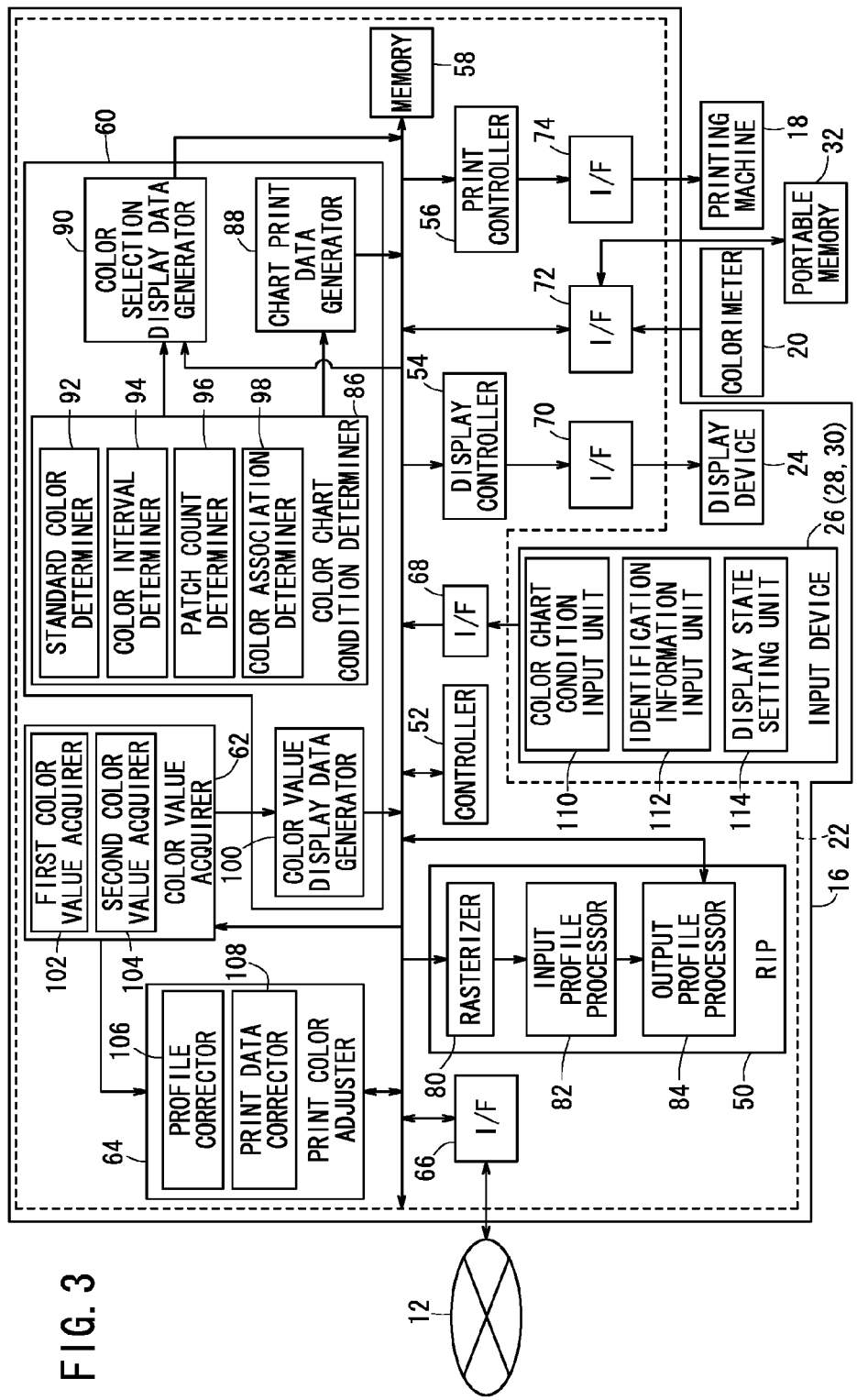
FIG. 3 is a functional block diagram of the image processing apparatus shown in FIG. 1.

FIG. 3 is a functional block diagram of the image processing apparatus 16 shown in FIG. 1.

As shown in FIG. 3, the main unit 22 of the image processing apparatus 16 includes a RIP (Raster Image Processor) 50, a controller 52, a display controller (display controller, auxiliary display controller) 54, a print controller 56, a memory (recording medium) 58, a color selection assistance processor 60, a color value acquirer 62, a print color adjuster 64, and five I/Fs 66, 68, 70, 72, 74.

The RIP 50 includes a rasterizer 80 for converting an electronic manuscript described by PDL into an electronic manuscript represented in a raster format, an input profile processor 82 for converting device-dependent data into device-independent data using an input profile, and an output profile processor 84 for converting device-independent data into device-dependent data using an output profile.

The controller 52, which may comprise a processor such as a CPU or the like, controls various components of the main unit 22, e.g., the RIP 50, the display controller 54, the color selection assistance processor 60, etc.

The display controller 54 is a control circuit, which is controlled by the controller 52 to energize the display device 24. More specifically, the display controller 54 outputs display control signals via the I/F 70 to the display device 24 in order to energize the display device 24 for displaying images.

The print controller 56 is a control circuit, which is controlled by the controller 52 to energize the printing machine 18. More specifically, the print controller 56 outputs print control signals via the I/F 74 to the printing machine 18 in order to energize the printing machine 18 for producing the print 36.

The memory 58 stores therein programs and data (e.g., data required for a processing sequence performed by the color selection assistance processor 60), which are required for the controller 52 to control the various components. The memory 58 may comprise a recording medium such as a nonvolatile memory, a hard disk, or the like.

The color selection assistance processor 60 includes a color chart condition determiner 86 for determining color chart conditions under which the color chart 36c is printed, a chart print data generator 88 for generating print data for printing the color chart 36c, and a color selection display data generator 90 for generating display data for displaying a simulative image, which simulates the color chart 36c.

The color chart condition determiner 86 includes a standard color determiner 92 for determining a standard color of the printed color chart 36c, a color interval determiner 94 for determining a color interval of the color patches 38, a patch count determiner 96 for determining a patch count of the color chart 36c, and a color association determiner 98 for determining a color association of the color chart 36c.

The chart print data generator 88 generates print data for printing the color chart 36c using the printing machine 18. The color selection display data generator 90 generates display data for displaying a simulative image, which simulates a layout of color patches 38 on the color chart 36c, and a gradation image that matches the tendency of color changes depending on the layout of the color patches 38 on the color chart 36c.

The print data generated by the chart print data generator 88, and the display data generated by the color selection display data generator 90 are not limited to raster data such as TIFF data or bitmap data, but may be print data in PDL format, including PDF and PostScript®.

The color selection assistance processor 60 also includes a color value display data generator (data converter) 100 for generating various data for displaying color data, which are acquired by the color value acquirer 62. The color value acquirer 62 includes a first color value acquirer 102 for acquiring color values of a color patch 38, which is ultimately selected from the color chart 36c, as first color values (also referred to as "selected color values"), and a second color value acquirer 104 for acquiring color values of a designated color as second color values. Color value data, which are generated by the color value display data generator 100, include device-independent data and/or device-dependent data (first color values, second color values), etc., depending on the color patches 38, colors of which are reproduced by the printing machine 18.

The print color adjuster 64 includes a profile corrector 106 for correcting a color conversion table defined by the profile of the printing machine 18 into a new profile, and a print data corrector 108 for correcting portions of an electronic manuscript into suitable color values.

The input device 26 functions as a color chart condition input unit 110 for entering color chart conditions via a color selection screen image 250 (see FIG. 7, etc.) to be described later. The input device 26 also functions as an identification information input unit 112 for entering identification information (in FIG. 2, row numbers 40 and column numbers 42) of the color patches 38. The input device 26 further functions as a display state setting unit 114 for setting various states (including selection of display or non-display, hereinafter referred to as "display state variables") concerning an auxiliary display for color selection assistance, via the color selection screen image 250.

Identification information of the color patches 38 may comprise information for uniquely identifying each of the color patches 38 on the color chart 36c, and may be any of various types. Identification information of the color patches 38 includes layout information (identification codes, positional relationships, etc.), or color information (color values obtained by colorimetry, etc.) of the color patches 38.

The I/F 66 makes it possible to connect the main unit 22 to the network 12. The I/F 68 makes it possible to connect the main unit 22 to the input device 26. The I/F 72 makes it possible to connect the main unit 22 to the colorimeter 20 (or the portable memory 32).

The image processing apparatus 16 according to the present embodiment is constructed basically as described above. Various image processing functions referred to above are realized by application software (programs) stored in the memory 58, such programs operating under the control of basic software (operating system).

Programs may be recorded in a computer-readable recording medium (e.g., the portable memory 32 shown in FIG. 1), and may be read into a computer system and executed thereby. The term "computer system" includes an operating system (OS) and hardware including peripheral devices. The computer-readable recording medium comprises a portable medium made up of a storage device such as a flexible disk, a magnetooptical disk, a CD-ROM, or the like, or a storage unit such as a hard disk or the like incorporated into the computer system. The computer-readable recording medium may also include a medium for dynamically holding programs for a short period of time, such as a communication line for transmitting programs via a network such as the Internet or the like, a communication channel such as a telephone line, or a memory for holding programs for a certain period of time, such as a volatile memory in a computer system that serves as a server or a client in a network environment.

The printing system 10 according to the present embodiment is constructed basically as described above. Operations of the printing system 10 will be described below with reference to the flowchart shown in FIG. 4 and the functional block diagram shown in FIG. 3.

First, the operator determines printing conditions for the print 36 (step S1). Printing conditions refer to the type of printing machine 18 used to produce the print 36, the type of print medium 34, the print mode, etc.

Then, the operator obtains color information of a designated color (step S2). Such color information refers to various items of information for specifying a color, and may include not only an actual color sample, but also color values or a type, etc., of the color sample. Color values of the color sample include device-independent data or device-dependent data. The type of color sample includes a manufacturer's name, a color sample number, etc.

Then, the operator makes fine adjustments of colors of the print 36 to be printed (step S3). Detailed operations of the image processing apparatus 16 with respect to fine adjustment of colors of the print 36 to be printed will be described later.

Then, the operator enters a prescribed command via the input device 26 to control the printing machine 18 to print the print 36 (step S4). An image processing sequence of the image processing apparatus 16 will be described below with reference to the functional block diagram shown in FIG. 3. The image processing apparatus 16 receives an electronic manuscript (PDL format) supplied from the editing apparatus 14 via the network 12 and the I/F 66. The electronic manuscript is represented by a page description language (PDL), which describes the print 36.

The rasterizer 80 converts data of the electronic manuscript (PDL format) received from the editing apparatus 14 into device-dependent data in raster format (e.g., 8-bit C, M, Y, K values). The input profile processor 82 converts the device-dependent data acquired from the rasterizer 80 into device-independent data (e.g., L*, a*, b* values). The output profile processor 84 converts the device-independent data acquired from the input profile processor 82 into device-dependent data (e.g., C, M, Y, K values). The print controller 56 converts the device-dependent data acquired from the output profile processor 84 into print control signals (ink propulsion control data). The print controller 56 then outputs print control signals via the I/F 74 to the printing machine 18 in order to control the printing machine 18 to print the desired print 36.

Figure 4:
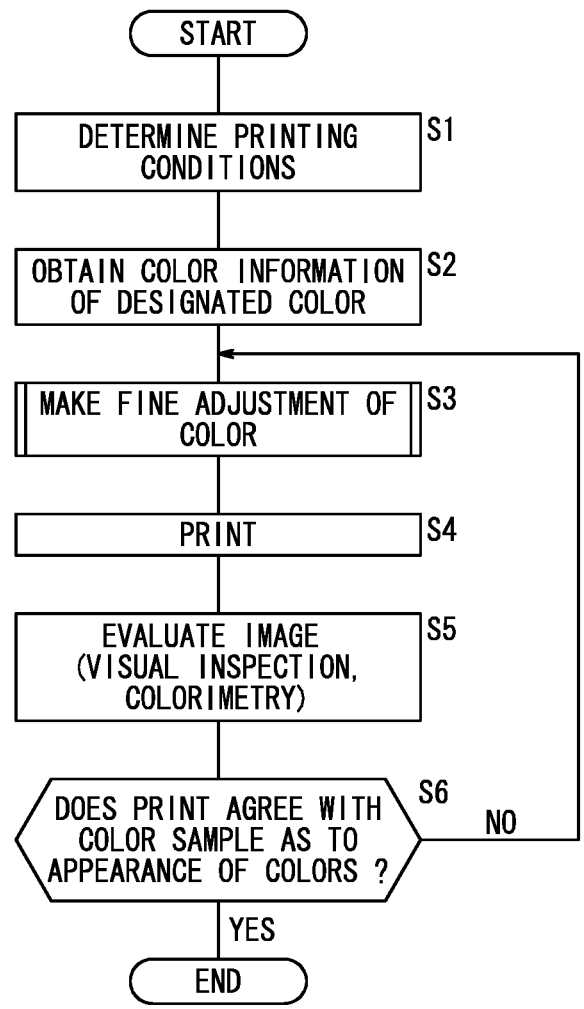
FIG. 4 is a flowchart of a sequence for producing a print of an appropriate color with the printing system shown in FIG. 1.

As shown in FIG. 4, the operator evaluates colors of the produced print 36 (step S5). The operator determines whether or not the appearance of colors in a given printed region of the print 36 and a color sample agree with each other (step S6). More specifically, the operator evaluates the appearance of colors according to a process of judging such colors through visual inspection of an overall or partial outlook of the image, or a process of determining whether or not colorimetric values of a certain area of the print 36, as measured by the colorimeter 20, fall within a desired range.

If the operator judges that the appearance of colors in the given printed region of the print 36 and the color sample are not in agreement with each other, then the operator makes fine adjustments to the colors of the print 36 that is printed (step S3). Printing of prints 36 and evaluation of colors are repeated (steps S3 through S6) until a print 36 having desired colors can be produced.

Figure 5:
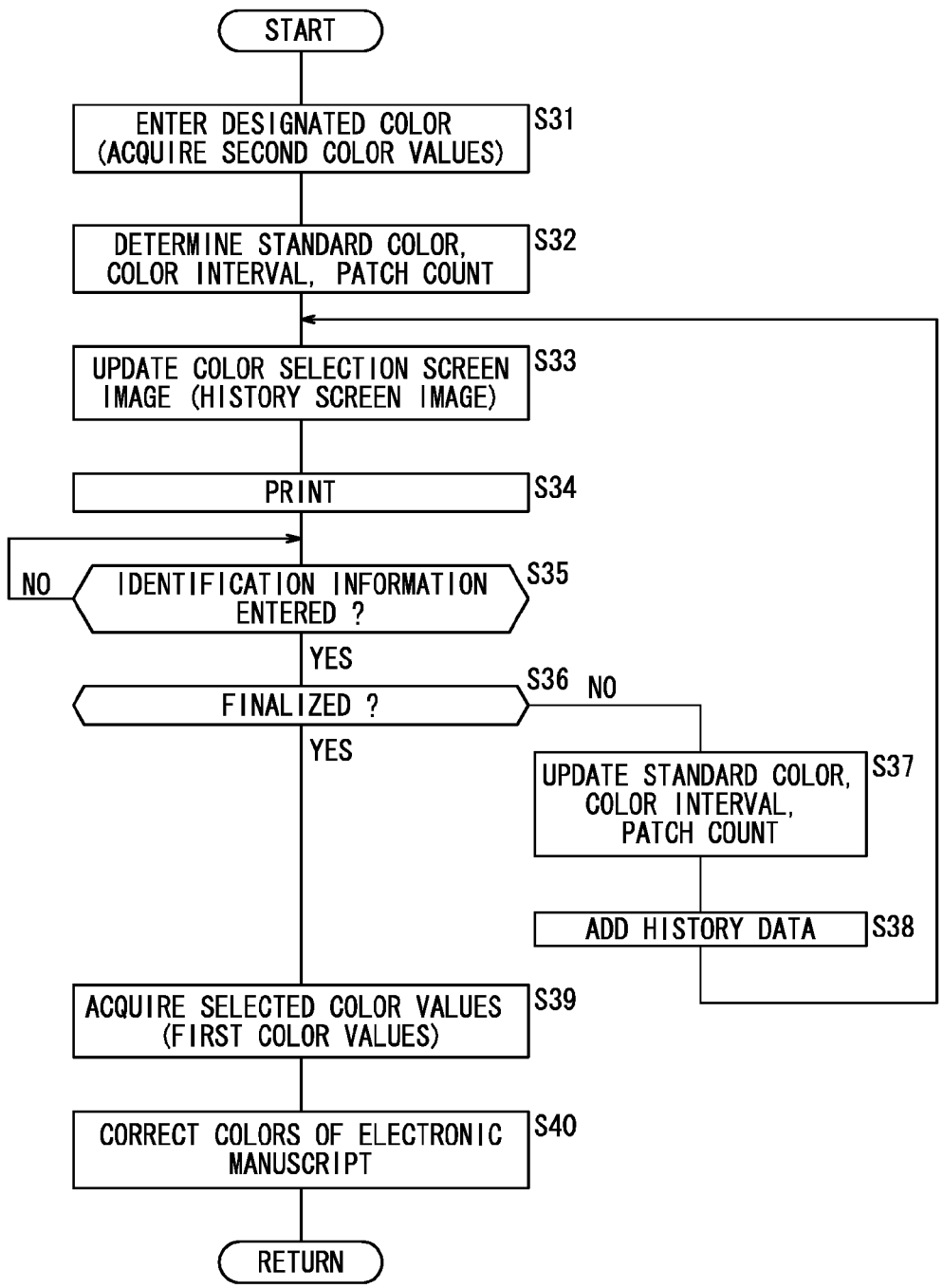
FIG. 5 is a flowchart of an operation sequence of the image processing apparatus shown in FIG. 1, during a fine color adjusting step, as shown in FIG. 4.

An operation sequence of the image processing apparatus 16 of FIGS. 1 and 3 for making fine adjustments to colors of the print 36 to be printed (step S3) will be described in detail below with reference to the flowchart shown in FIG. 5.

In response to a prescribed action made by the operator, the image processing apparatus 16 enters color information of a designated color and acquires second color values (step S31).

Figure 6:
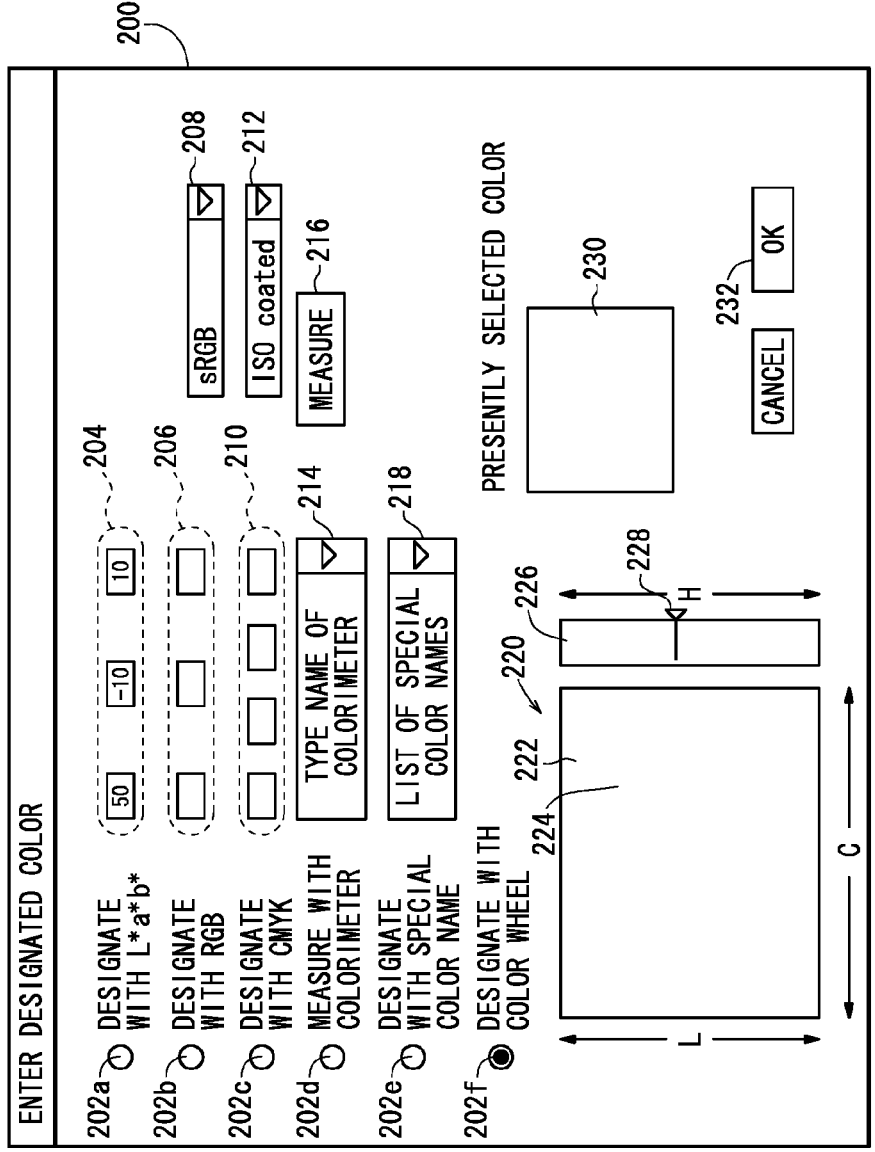
FIG. 6 is a view showing by way of example a screen image for entering color information of a designated color.

Prior to entering color information of a designated color, the display controller 54 (see FIG. 3) controls the display device 24 in order to display an input screen image 200 shown in FIG. 6.

The operator selects one of a plurality of processes (six processes in FIG. 6) for entering color information of a designated color. More specifically, the operator clicks with the mouse 30 one of radio buttons 202a through 202f on the input screen image 200, which is displayed by the display device 24 (see FIG. 1).

The radio button 202a corresponds to "DESIGNATE with L*a*b*", which represents a process of directly entering known L*, a*, b* values of a designated color. More specifically, using the keyboard 28 (see FIG. 1), the operator enters the L*, a*, b* color values into three text boxes 204 successively from the left.

The radio button 202b corresponds to "DESIGNATE WITH RGB", which represents a process of directly entering known R, G, B values of a designated color. More specifically, using the keyboard 28, the operator enters R, G, B color values into three text boxes 206 successively from the left. Then, using a pull-down menu 208, the operator selects a suitable target profile (e.g., "sRGB" in FIG. 6) depending on the purpose of the print. The main unit 22 then converts the R, G, B color values (which were entered in the text boxes 206) into the L*, a*, b* values according to RGB-L*a*b* conversion formulas corresponding to the selected target profile.

The radio button 202c corresponds to "DESIGNATE WITH CMYK", which represents a process of directly entering the known C, M, Y, K values of a designated color. More specifically, using the keyboard 28, the operator enters C, M, Y, K color values into four text boxes 210 successively from the left. Then, using a pull-down menu 212, the operator selects a suitable target profile (e.g., "ISO coated" in FIG. 6) depending on the purpose of the print. The main unit 22 then converts the C, M, Y, K color values (which were entered in the text boxes 210) into the L*, a*, b* values according to CMYK-L*a*b* conversion formulas corresponding to the selected target profile.

The radio button 202d corresponds to "MEASURE WITH COLORIMETER", which represents a process of measuring a color sample such as a color chip or the like with the colorimeter 20, and entering L*, a*, b* values. More specifically, the operator sets a color sample in a state such that the color sample can be measured by the colorimeter 20. Then, using the mouse 30, the operator enters the type name of the colorimeter 20 through a pull-down menu 214, and clicks on a "MEASURE" button 216. The main unit 22 acquires color values from the colorimeter 20 via the I/F 72 (see FIG. 3).

The radio button 202e corresponds to "DESIGNATE WITH SPECIAL COLOR NAME", which represents a process of referring to special color names (selectable by a pull-down menu 218) stored and managed in the memory 58 or the database DB, and acquiring L*, a*, b* values, which correspond to a selected special color name.

The radio button 202f corresponds to "DESIGNATE WITH COLOR WHEEL", which represents a process of acquiring L*, a*, b* values using a color wheel 220. More specifically, the operator drags the mouse 30 to move a ring pointer 224 on a color pallet 222, to thereby change designated colors depending on chromaticity (C) values, as a variable on the horizontal axis of the color pallet 222, and lightness (L) values thereof, as a variable on the vertical axis of the color pallet 222. Alternatively, the operator drags the mouse 30 to vertically move a triangular pointer 228 along a bar 226, to thereby change designated colors depending on a hue (H) value thereof, as a variable on the vertical axis of the bar 226. A rectangular patch 230 may display a color, which is the same as the color that is currently indicated by the ring pointer 224 and the triangular pointer 228.

If the operator clicks on an "OK" button 232, the main unit 22 enters color information of the designated color and acquires L*, a*, b* values depending on the color information.

Then, in response to a prescribed action made by the operator, the image processing apparatus 16 determines a standard color, a color interval, and a patch count (step S32). Prior to determination of the standard color, the color interval, and the patch count, the display controller 54 controls the display device 24 to display the color selection screen image 250 shown in FIG. 7.

The color selection screen image 250 includes a chart simulating image 252 (simulative image) on its upper center, which simulates the layout of the color patches 38 on the color chart 36c.

The color selection screen image 250 also includes a horizontally extending color bar (gradation image) 254 displayed above the chart simulating image 252. The color selection screen image 250 displays a continuous gradation of colors, such that L* values thereof increase linearly (linearly over horizontal positions on the color bar 254) from a right end 254l onto a left end 254h of the color bar 254. Colors displayed on the color bar 254 agree with the tendency of color changes (values L*), which depend on the layout of the color patches 38 (see FIG. 2B).

The color selection screen image 250 further includes a vertically extending color bar (gradation image) 256, which is displayed to the left of the chart simulating image 252, in a continuous gradation of colors such that b* values thereof increase linearly from a lower end 256*l* to an upper end 256*h* of the color bar 256. Colors displayed on the color bar 256 agree with the tendency of color changes (b* values), which depend on the layout of the color patches 38 (see FIG. 2B).

The color selection screen image 250 further includes a horizontally extending color bar (gradation image) 258, which is displayed beneath a left portion of the chart simulating image 252, in a continuous gradation of colors such that a* values thereof increase linearly from a left end 258*l* to a right end 258*h* of the color bar 258. Colors displayed on the color bar 258 agree with the tendency of color changes (a* values), which depend on the layout of the color patches 38 (see FIG. 2B).

The chart simulating image 252 includes twenty-seven patch images 260, and a background image 262 surrounding the patch images 260.

The color selection screen image 250 also includes a setting field 264 displayed below the chart simulating image 252, for allowing displayed details to be freely changed if given tabs are clicked on. To the right of the setting field 264, buttons 266, 268, 270, 272, 274 are displayed, indicated respectively from above by the terms, "UPDATE STANDARD COLOR", "PRINT", "FINALIZE", "RETURN", and "CANCEL".

The setting field 264 includes four pull-down menus 280, 282, 284, 286, a button 288 indicated by the term "UPDATE", a pair of radio buttons 290 for alternatively selecting "DISPLAY"/"NON-DISPLAY" for a color searching history, and a pair of radio buttons 292 for alternatively selecting "AUTOMATIC"/"MANUAL" for updating the color interval.

The operator enters a patch count ("3" in FIG. 7) for the L* axis through the pull-down menu 280 in the setting field 264, and enters a patch count ("3" in FIG. 7) for the a* axis and the b* axis through the pull-down menu 282 in the setting field 264. The operator also enters a color interval (color difference $\Delta e$="8" in FIG. 7) for the L* axis through the pull-down menu 284 in the setting field 264, and enters a color interval (color difference $\Delta e$="8" in FIG. 7) for the a* axis and the b* axis through the pull-down menu 286 in the setting field 264.

Figure 7:
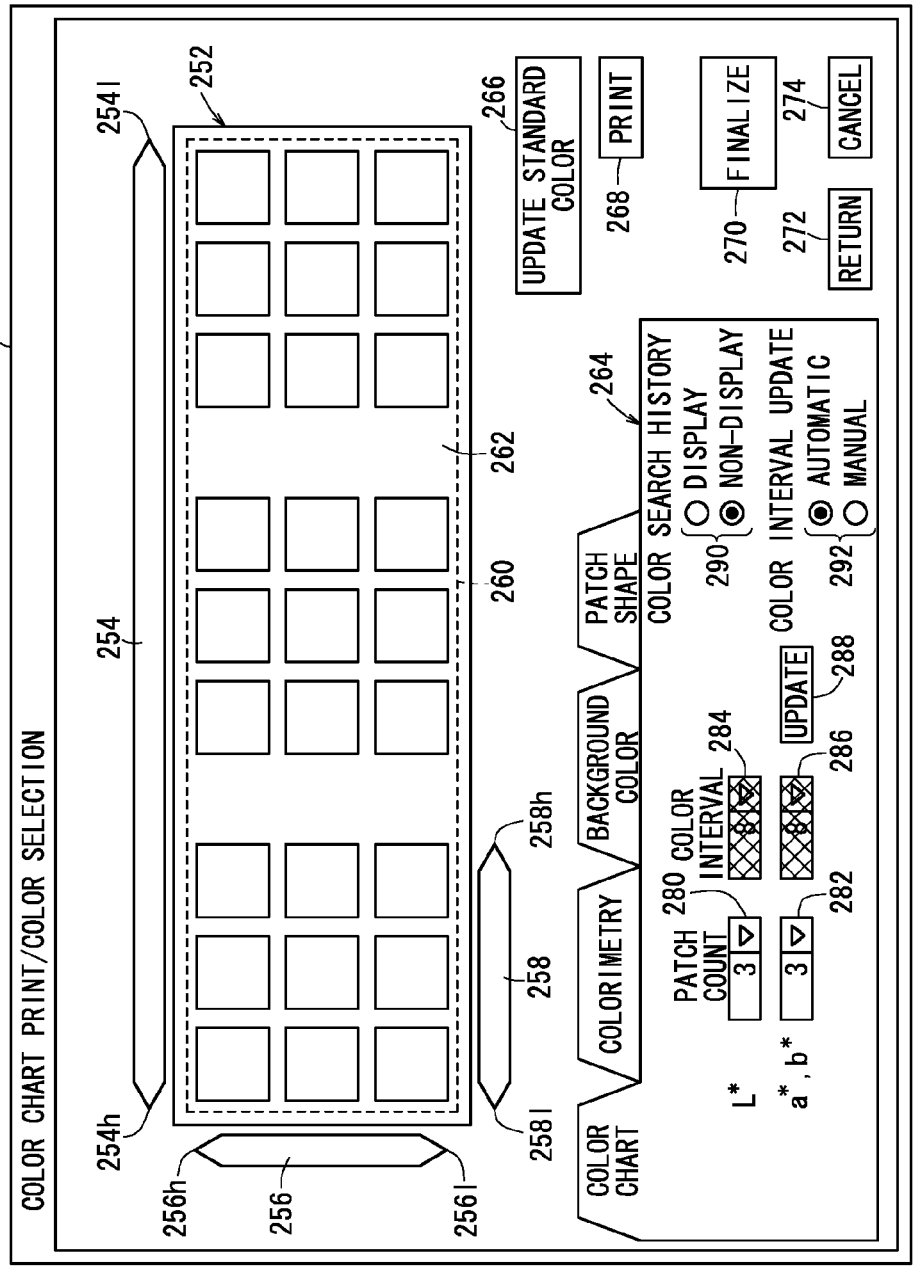
FIG. 7 is a view showing by way of example a color selection screen image according to the embodiment of the present invention.

Then, the display controller 54 updates and displays the color selection screen image 250 shown in FIG. 7 (step S33).

The color chart condition determiner 86, as shown in FIG. 3, reads and acquires predetermined initial values of color chart conditions from the memory 58. Alternatively, in response to the operator clicking on the "UPDATE" button 288, the color chart condition determiner 86 may acquire presently set color chart conditions from the color chart condition input unit 110 via the I/F 68.

The standard color determiner 92 determines a standard color for the displayed chart simulating image 252. The color interval determiner 94 determines a color interval of the chart simulating image 252. The patch count determiner 96 determines a patch count of the chart simulating image 252. The color association determiner 98 determines a color association between the layout and colors of the patch images 260 on the chart simulating image 252.

Thereafter, the color selection display data generator 90 generates display data for displaying the chart simulating image 252 based on the color chart conditions acquired from the color chart condition determiner 86, and supplies the generated display data to the display controller 54. The display controller 54 outputs the supplied display data via the I/F 70 to the display device 24, and controls the display device 24 in order to display the color selection screen image 250 (chart simulating image 252).

Specific display processes for the color bars 254, 256, 258, according to features of the present invention and the relationship thereof to the chart simulating image 252, will be described later.

As described above, the display colors or the number of patch images 260 in the chart simulating image 252 is updated immediately and displayed on the color selection screen image 250 shown in FIG. 7, based on the presently input color chart conditions.

Then, the operator enters a prescribed command in order to instruct the printing machine 18 to print the color chart 36*c* (step S34).

In response to the operator clicking on the "PRINT" button 268 (see FIG. 7), the color chart condition determiner 86 (see FIG. 3) acquires the presently set color chart conditions from the color chart condition input unit 110 via the I/F 68.

More specifically, the standard color determiner 92 determines the values that were entered via the input screen image 200 as standard colors of the color patches 38. The color interval determiner 94 determines the values entered in the setting field 264 (pull-down menus 284, 286 shown in FIG. 7) as a color interval of the color patches 38. The patch count determiner 96 determines the values entered in the setting field 264 (pull-down menus 280, 282 shown in FIG. 7) as a patch count of the color chart 36*c*. The color association determiner 98 determines a color association between the layout and colors of the color patches 38 on the color chart 36*c* (see FIG. 2B).

The chart print data generator 88 determines data addresses depending on respective positions of the color patches 38, using the patch count acquired from the color chart condition determiner 86. Thereafter, the chart print data generator 88 determines color values of the color patches, using the reference color, the color interval, and the color association acquired from the color chart condition determiner 86.

The chart print data generator 88 then generates print data for printing the color chart 36*c* based on the data addresses and the color values of the color patches 38, and supplies the generated print data to the RIP 50.

The RIP 50 appropriately processes the supplied print data, and supplies the processed print data to the print controller 56. If the print data are PDL-format data, then the RIP 50 instructs the rasterizer 80 and the output profile processor 84 to process the print data. Alternatively, if the print data are raster-format data, then the RIP 50 instructs the output profile processor 84 to process the print data.

The print controller 56 outputs the processed print data via the I/F 74 to the printing machine 18, and controls the printing machine 18 to print the color chart 36*c*.

Referring back to FIG. 5, the image processing apparatus 16 determines whether identification information of the color patches 38 has been entered or not (step S35). The image processing apparatus 16 repeats step S35 until the operator has entered the row numbers 40 and the column numbers 42.

The operator compares and evaluates the color patches 38 on the color chart 36*c* printed in step S34 with the color sample (designated color), which is to be reproduced by the printing machine 18. Then, the operator selects a color patch 38 closest in color to the color sample. For example, the operator may select a color patch 38 based on a subjective view acquired through visual comparative observation. Alternatively, the operator may directly measure the color patches 38 using the colorimeter 20, and select a color patch 38 having a color that the operator thinks is closest to the designated color, based on color values obtained by the colorimeter 20.

The "color closest to the designated color" referred to herein is judged according to subjective or objective standards. No issue is raised concerning whether or not the operator has been able to select a color patch 38 the color difference of which from the color sample (designated color) is minimum.

In a case where the operator makes a visual comparative observation, the operator may want to confirm the present position (color values) of a color patch 38 in a color space. At this time, the operator clicks on one of the radio buttons 290 in order to change the color search history from "NON-DISPLAY" to "DISPLAY". Then, the display controller 54 updates and displays the color selection screen image 250 shown in FIG. 7, depending on a display state variable (selection of display or non-display) from the display state setting unit 114, thereby adding an auxiliary display for assisting color selection. Operations of the image processing apparatus 16 for achieving an auxiliary display will be described in detail below with reference to the detailed block diagram shown in FIG. 8.

Figure 8:
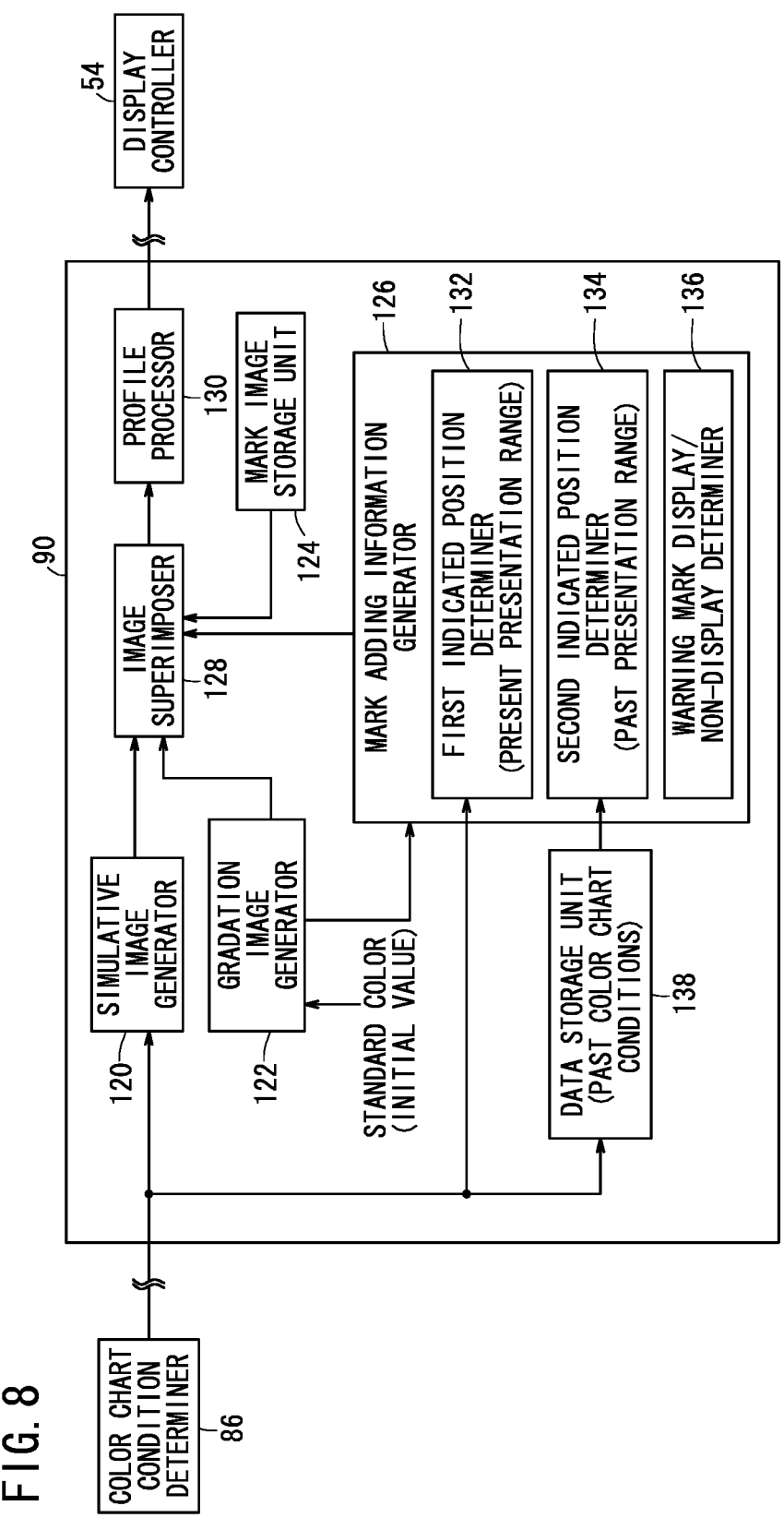
FIG. 8 is a block diagram of a color selection display data generator shown in FIG. 3.

As shown in FIG. 8, the color selection display data generator 90 (see FIG. 3) essentially includes a simulative image generator 120 for generating the chart simulating image 252, a gradation image generator 122 for generating the color bars 254, etc., a mark image storage unit 124 for storing mark images 400, 402, 404 (see FIG. 9, to be described in detail later), a mark adding information generator 126 for generating positional information (hereinafter referred to as "mark adding information"), which is used for adding the mark images 400, etc., to the color bars 254, an image superimposer 128 for superimposing the chart simulating image 252, the color bars 254, etc., and the mark images 400, etc., and a profile processor 130 for performing an output profile process (color converting process) on the superimposed images, which depends on the display device 24.

The mark adding information generator 126 includes a first indicated position determiner 132 for determining indicated positions of the mark images 400, etc., depending on a present presentation range provided by the color patches 38, a second indicated position determiner 134 for determining indicated positions of the mark images 400, etc., depending on a past presentation range, and a warning mark display/non-display determiner 136 for determining whether or not a warning mark image needs to be displayed.

Operations of the color selection display data generator 90 will be described in detail below.

First, the simulative image generator 120 generates the chart simulating image 252 based on the color chart conditions (the standard color, the color interval, the patch count, and the color association) acquired from the color chart condition determiner 86, in a similar manner as the chart print data generator 88 (see FIG. 3), which operates as described above.

Thereafter, the gradation image generator 122 generates the color bars 254, etc., which match the tendency of color changes, depending on the layout of the color patches 38. In FIG. 8, the gradation image generator 122 generates the color bars 254, etc., which exhibit a gradation around the initial values of the reference color, i.e., the second color values entered through the input screen image 200 (see FIG. 6).

The format by which the color bars 254, etc., are displayed may be changed in various ways depending on the presentation range. The gradation image generator 122 may change at least one of a size (length and width), a color gradient, and a color range of the color bars 254. For example, if the color range of the color bars 254 is increased, then the operator can confirm the state of the colors generally, whereas if the color range of the color bars 254 is reduced, then the operator can confirm the state of the colors more strictly.

The gradation color image should preferably be made up of at least three color bars. The total number of colors that can be produced by independently changing at least three variables (e.g., $L^*$, $a^*$, $b^*$ values, C, M, Y, K values, or the like) is vast, thus making it difficult for the operator to select a suitable color from the color chart 36c, which includes the color patches 38 arrayed in a two-dimensional pattern. Gradation images, which are provided depending on the types of variables, make it easy for the operator to grasp the color search range.

Thereafter, the first indicated position determiner 132 (the mark adding information generator 126) calculates a color presentation range provided by the color patches 38, based on color chart conditions acquired from the color chart condition determiner 86. More specifically, the first indicated position determiner 132 calculates upper limit values ($L^*+\Delta L^*$, $a^*+\Delta a^*$, $b^*+\Delta b^*$ in FIG. 2B) for the $L^*$, $a^*$, $b^*$ values, and also calculates lower limit values ($L^*-\Delta L^*$, $a^*-\Delta a^*$, $b^*-\Delta b^*$ in FIG. 2B) for the $L^*$, $a^*$, $b^*$ values. Then, the first indicated position determiner 132 generates mark adding information, including image sizes and positions of the mark images 400, etc., based on color determining conditions for gradations of the color bars 254, etc., which are acquired from the gradation image generator 122.

The mark images stored in the mark image storage unit 124 may be in various forms or patterns, insofar as the mark images can be visually recognized by the operator. Examples of such patterns include closed regions, frames, line segments, letters, symbols, indexes, etc. Examples of colors of the mark images include opaque colors, such as chromatic colors, achromatic colors, etc., and semitransparent colors. Examples of display modes for the mark images include still image display modes, moving image display modes (e.g., a flickering image display mode), and inverted gradation display modes.

Thereafter, the image superimposer 128 superimposes the chart simulating image 252 acquired from the simulative image generator 120, the color bars 254, etc., acquired from the gradation image generator 122, and the mark images 400, etc., acquired from the mark image storage unit 124. Then, the image superimposer 128 initially places the chart simulating image 252 in a given data area, and places the color bars 254, 256, 258 respectively around three sides of the chart simulating image 252 in spaced relation thereto. Then, the image superimposer 128 places the mark images 400, 402, 404 in respective suitable positions with respect to the color bars 254, 256, 258, while referring to the mark adding information acquired from the mark adding information generator 126.

Thereafter, the profile processor 130 performs a profile process, which is suitable for the display device 24, on the superimposed image data acquired from the image superimposer 128, thereby producing auxiliary display data for color selection assistance. More specifically, the profile processor 130 converts the superimposed image data from device-independent data (e.g., $L^*$, $a^*$, $b^*$ values) into device-dependent data (e.g., R, G, B values).

Finally, the display controller 54 outputs the display data acquired from the profile processor 130 via the I/F 70 to the display device 24, and controls the display device 24 to display a color selection screen image 250 (auxiliary display screen image).

Figure 9:
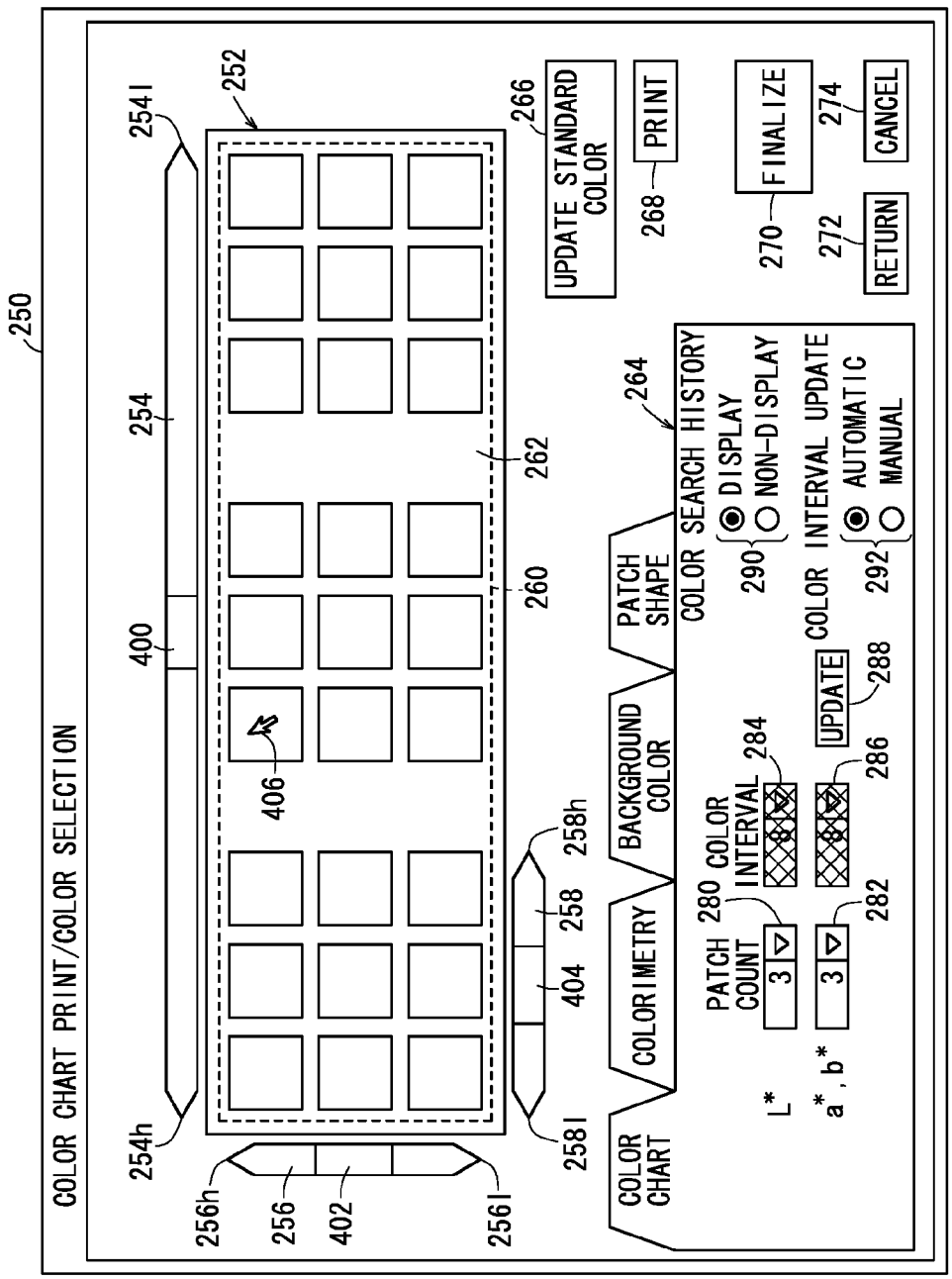
FIG. 9 is a view showing a first change of the color selection screen image shown in FIG. 7.

In this manner, the display controller 54 changes the color selection screen image 250 shown in FIG. 7 into the color selection screen image 250 shown in FIG. 9.

The color selection screen image 250 shown in FIG. 9 includes a rectangular mark image 400 displayed in a given superposed position on the color bar 254. The position of the left end of the mark image 400 corresponds to the upper limit value (L*+ΔL* in FIG. 2B) of the presentation range for the L* value according to the color patches 38. The position of the right end of the mark image 400 corresponds to the lower limit value (L*−ΔL* in FIG. 2B) of the presentation range for the L* value according to the color patches 38.

The color selection screen image 250 shown in FIG. 9 also includes a rectangular mark image 402 displayed in a given superposed position on the color bar 256. The position of the upper end of the mark image 402 corresponds to the upper limit value (b*+Δb* in FIG. 2B) of the presentation range for the b* value according to the color patches 38. The position of the lower end of the mark image 402 corresponds to the lower limit value (b*−Δb* in FIG. 2B) of the presentation range for the b* value according to the color patches 38.

The color selection screen image 250 shown in FIG. 9 further includes a rectangular mark image 404 displayed in a given superposed position on the color bar 258. The position of the right end of the mark image 404 corresponds to the upper limit value (a*+Δa* in FIG. 2B) of the presentation range for the a* value according to the color patches 38. The position of the left end of the mark image 404 corresponds to the lower limit value (a*−Δa* in FIG. 2B) of the presentation range for the a* value according to the color patches 38.

Figure 10:
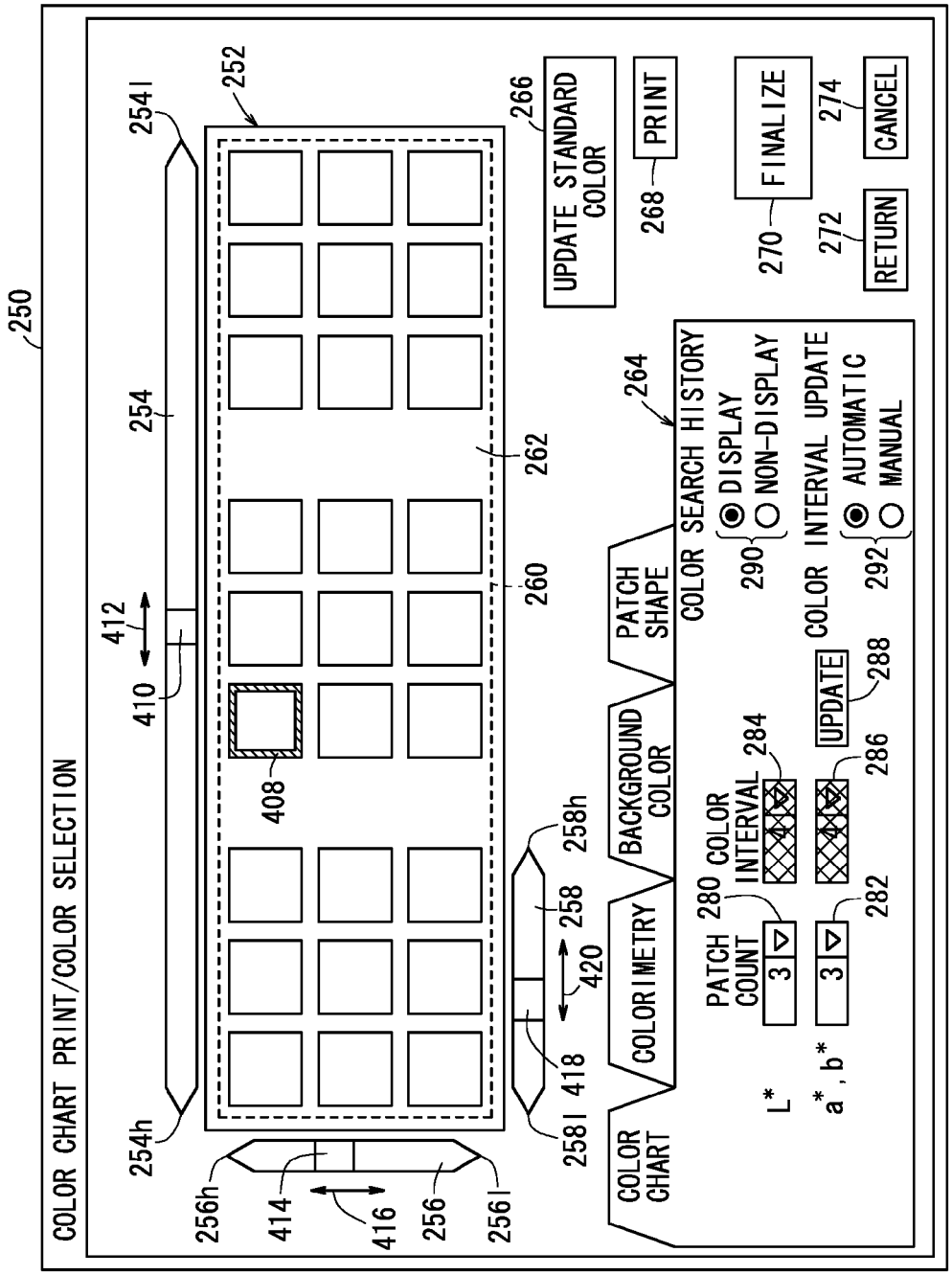
FIG. 10 is a view showing a second change of the color selection screen image shown in FIG. 7.

As shown in FIG. 9, for example, the operator clicks on the mouse 30 while placing a pointer 406 within the chart simulating image 252. Then, as shown in FIG. 10, a frame is applied to the outer periphery of a patch image 408, which is indicated by the pointer 406. The applied frame indicates that the patch image 408 (corresponding to the color patch 38, the row number 40 of which is "1" and the column number 42 of which is "1") is presently selected.

If the color of a color patch is closely approximate to the designated color, then only one color patch 38 may be selected. Alternatively, an intermediate color between adjacent color patches 38 may be entered using a GUI control object, such as a color wheel or the like. If the colors represented by any of the twenty-seven color patches 38 are not pertinent, then the operator may decide that the designated color is not within the range of the twenty-seven color patches 38, and may make a selection reflecting that decision. Furthermore, by means of a text box or the like, the operator may directly enter a color sample number, color values, or the like, corresponding to the color of a selected color patch 38.

Numerical values representing color values of the patch image 408, which is indicated by the pointer 406, may be displayed for the operator to refer to. For example, the L*, a*, b* values may be displayed in a balloon.

While selecting the patch image (the patch image 408 indicated by the pointer 406) in the chart simulating image 252 shown in FIG. 9, the operator clicks on either one of the "UPDATE STANDARD COLOR" button 266 or the "FINALIZE" button 270. Then, control proceeds to the next step S36 in FIG. 5. If the operator wishes to finalize the color and end the selection process, then the operator clicks on the "FINALIZE" button 270. If the operator does not wish to finalize the color, then the operator clicks on the "UPDATE STANDARD COLOR" button 266.

Turning back to FIG. 5, the image processing apparatus 16 determines whether a color has been finalized or not (step S36). If the image processing apparatus 16 judges that a color has not been finalized, i.e., if the image processing apparatus 16 accepts clicking on the "UPDATE STANDARD COLOR" button 266, then the color chart condition determiner 86 acquires color chart conditions from the color chart condition input unit 110 via the I/F 68, and updates values of the standard color, the color interval, and the patch count (step S37). At this time, the color chart condition determiner 86 may update the values of the standard color, the color interval, and the patch count according to any of various determining algorithms, one example of which is described below.

The standard color determiner 92 shown in FIG. 3 determines color values depending on the patch image 260 (e.g., patch image 408) entered (selected) in step S35 as representing a new standard color.

The color interval determiner 94 determines a color interval of the color patches 38 automatically or manually, depending on whether "AUTOMATIC" or "MANUAL" is selected by the operator with the radio buttons 292 shown in FIG. 9.

If the operator selects "MANUAL" with one of the radio buttons 292, then the color chart condition determiner 86 determines a color interval, which is the same as the previously determined color interval. Then, upon execution of step S33 or step S34, the operator can reset the color interval using the pull-down menus 284, 286. More specifically, after the entered values have been changed, the operator clicks on the "UPDATE" button 288, and the color interval determiner 94 determines the entered and changed values as a new color interval.

If the operator selects "AUTOMATIC" with the other radio button 292, then the color interval determiner 94 determines a new color interval according to predetermined rules. For example, if it is judged that a color closest to the designated color exists within the presentation range on the previous color chart 36c, then the color interval determiner 94 determines a value, which is one-half of the previously determined color interval, as a new color interval. On the other hand, if it is judged that a color closest to the designated color does not exist within the presentation range, then the color interval determiner 94 determines the previously determined color interval as a new color interval.

Then, the color selection display data generator 90 adds the history data of the color chart conditions (step S38). As shown in FIG. 8, the color selection display data generator 90 includes a data storage unit 138. The data storage unit 138 stores color chart conditions (results of a first operational cycle) acquired from the color chart condition determiner 86.

The display controller 54 updates and displays the color selection screen image 250 shown in FIG. 9 (step S33). Subsequently, steps S33 through S38 are repeated until a color has been finalized.

While step S33 is repeatedly executed, if the operator selects "DISPLAY" for a color searching history with one of the radio buttons 290, then the display controller 54 changes the details of the auxiliary display on the color selection screen image 250 shown in FIG. 9 into the details shown in FIG. 10, depending on the states set by the display state setting unit 114. By clicking on one of the radio buttons 290, the operator is capable of selecting whether the mark images 400, etc., are to be displayed or not.

As shown in FIG. 10, in place of the mark image 400 shown in FIG. 9, a new mark image 410 is displayed in a superposed position on the color bar 254. The mark image 410 has a horizontal length (ΔL*=4), which is one-half of the horizontal length (ΔL*=8) of the mark image 400 shown in FIG. 9. In addition, an arrow image (history mark image) 412, which is of the same length as the length (ΔL*=8) of the mark image 400, is displayed above the color bar 254, in the same position as the superimposed position of the mark image 400 shown in FIG. 9.

In place of the mark image 402 shown in FIG. 9, a new mark image 414 is displayed in a superposed position on the color bar 256. The mark image 414 has a vertical length ($\Delta b^*=4$), which is one-half of the vertical length ($\Delta b^*=8$) of the mark image 402 shown in FIG. 9. In addition, an arrow image (history mark image) 416, which is of the same length as the length ($\Delta b^*=8$) of the mark image 402, is displayed to the left of the color bar 256, in the same position as the superimposed position of the mark image 402 shown in FIG. 9.

Furthermore, in place of the mark image 404 shown in FIG. 9, a new mark image 418 is displayed in a superposed position on the color bar 258. The mark image 418 has a horizontal length ($\Delta a^*=4$), which is one-half of the horizontal length ($\Delta a^*=8$) of the mark image 404 shown in FIG. 9. In addition, an arrow image (history mark image) 420, which is of the same length as the length ($\Delta a^*=8$) of the mark image 404, is displayed beneath the color bar 258, in the same position as the superimposed position of the mark image 404 shown in FIG. 9.

Operations of the color selection display data generator 90 will be described below. Details that have already been described with respect to step S33 will be omitted.

As shown in FIG. 8, the simulative image generator 120 generates a chart simulating image 252 based on the color chart conditions acquired from the color chart condition determiner 86.

Thereafter, the gradation image generator 122 generates color bars 254, etc., which match the tendency of color changes depending on the layout of the color patches 38.

Thereafter, the first indicated position determiner 132 (mark adding information generator 126) calculates a color presentation range that is provided by the color patches 38, and generates mark adding information including image sizes and positions of the mark images 400, 414, 418 (see FIG. 10).

The first indicated position determiner 132 (mark adding information generator 126) also calculates a color presentation range provided by the color patches 38, based on past color chart conditions acquired from the data storage unit 138. The second indicated position determiner 134 generates mark adding information, including image sizes and positions of the arrow images 412, 416, 420 (see FIG. 10), based on the conditions for generating gradations of the color bars 254, etc., acquired from the gradation image generator 122.

Thereafter, the image superimposer 128 superimposes the chart simulating image 252 acquired from the simulative image generator 120, the color bars 254, etc., acquired from the gradation image generator 122, the mark images 400, etc., acquired from the mark image storage unit 124, and the arrow images 412, etc., acquired from the mark image storage unit 124. The image superimposer 128 initially places the chart simulating image 252 in a given data area, and places the color bars 254, 256, 258 respectively around three sides of the chart simulating image 252, in spaced relation thereto. Then, the image superimposer 128 places the mark images 400, 402, 404 in respective suitable positions with respect to the color bars 254, 256, 258, while referring to the mark adding information (present search range) acquired from the mark adding information generator 126. Thereafter, the image superimposer 128 places the arrow images 412, 416, 420 in respective suitable positions with respect to the color bars 254, 256, 258, while referring to the mark adding information (past search range) acquired from the mark adding information generator 126.

Thereafter, the profile processor 130 performs a profile process, which is suitable for the display device 24, on the superimposed image data acquired from the image superimposer 128, thereby producing auxiliary display data for color selection assistance.

Finally, the display controller 54 outputs the display data acquired from the profile processor 130 via the I/F 70 to the display device 24, and controls the display device 24 to display a color selection screen image 250 (auxiliary display screen image).

The display controller 54 changes the color selection screen image 250 shown in FIG. 9 into the color selection screen image 250 shown in FIG. 10. In the color selection screen image 250 shown in FIG. 10, the present (second operational cycle) color chart conditions are visually displayed on the color bars 254, 256, 258. At the same time, past (first operational cycle) color chart conditions are displayed together as the arrow images 412, 416, 420.

In this manner, the indicated positions of the mark images 400, 402, 404, which depend on the color chart 36c printed in the past, may be displayed as the arrow images 412, 416, 420 together with the color bars 254, 256, 258. The operator is able to judge the adequacy of the present operational details from the positional relationship of the color bars 254, 256, 258 (or the mark images 410, 414, 418) to the positions and lengths of the arrow images 412, 416, 420. For example, if the length of the mark image 410, i.e., the presentation range of the L* value in the second operation cycle, is shorter than the length of the arrow image 412, i.e., the presentation range of the L* value in the first operation cycle, then the operator can judge that the color selection process is progressing normally, in view of the results of the first operational cycle.

After the color chart 36c has been printed (step S34), it is assumed that a color patch 38, the row number 40 of which is "0" and the column number 42 of which is "−1", is selected. If no color is finalized, then by the operator clicking on the "UPDATE STANDARD COLOR" button 266 while a patch image 421 (see FIG. 11) is selected, steps S36 through S38 are carried out. In step S38, the data storage unit 138 shown in FIG. 8 stores color chart conditions (the results of the second operational cycle) acquired from the color chart condition determiner 86.

Figure 11:
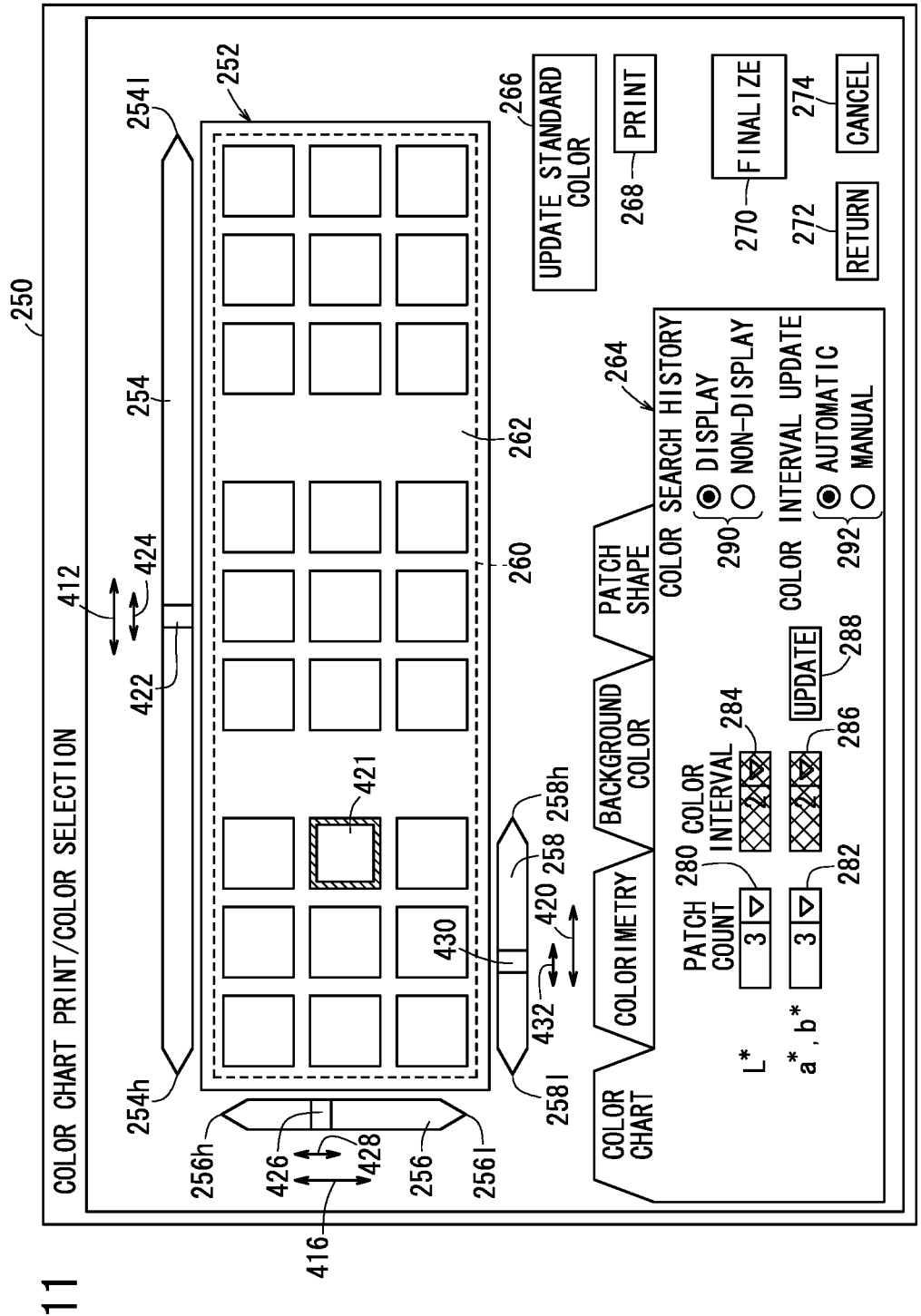
FIG. 11 is a view showing a third change of the color selection screen image shown in FIG. 7.

In a third color selection cycle, the display controller 54 changes the details of the auxiliary display in the color selection screen image 250 shown in FIG. 10 to the details of the auxiliary display shown in FIG. 11 (step S33).

As shown in FIG. 11, in place of the mark image 410 shown in FIG. 10, a new mark image 422 is displayed in a superposed position on the color bar 254. The mark image 422 has a horizontal length ($\Delta L^*=2$), which is one-half of the horizontal length ($\Delta L^*=4$) of the mark image 410 shown in FIG. 10. In addition, an arrow image (history mark image) 424, of a length that is the same as the length ($\Delta L^*=4$) of the mark image 410, is displayed above the color bar 254, in the same position as the superimposed position of the mark image 410 shown in FIG. 10. The arrow image 412, which is displaced upwardly from the position shown in FIG. 10, also is displayed above the arrow image 424.

In place of the mark image 414 shown in FIG. 10, a new mark image 426 is displayed in a superposed position on the color bar 256. The mark image 426 has a vertical length ($\Delta b^*=2$), which is one-half of the vertical length ($\Delta b^*=4$) of the mark image 414 shown in FIG. 10. In addition, an arrow image (history mark image) 428, of a length that is the same as the length ($\Delta b^*=4$) of the mark image 414, is displayed to the left of the color bar 256, in the same position as the superimposed position of the mark image 414 shown in FIG. 10. The arrow image 416, which is displaced leftwardly from the position shown in FIG. 10, also is displayed to the left of the arrow image 428.

Furthermore, in place of the mark image 418 shown in FIG. 10, a new mark image 430 is displayed in a superposed position on the color bar 258. The mark image 430 has a horizontal length ($\Delta a^*=2$), which is one-half of the horizontal length ($\Delta a^*=4$) of the mark image 418 shown in FIG. 10. In addition, an arrow image (history mark image) 432, of a length that is the same as the length ($\Delta a^*=4$) of the mark image 418, is displayed beneath the color bar 258, in the same position as the superimposed position of the mark image 418 shown in FIG. 10. The arrow image 420, which is displaced downwardly from the position shown in FIG. 10, also is displayed beneath the arrow image 432.

For producing the auxiliary display of the mark images 422, 426, 430 and the arrow images 424, 428, 432, 412, 416, 420, the color selection display data generator 90 operates essentially in the same manner as described above with respect to step S33 (second operational cycle), except that the second indicated position determiner 134 (mark adding information generator 126) generates mark adding information, including image sizes and positions of the arrow images 424, 428, 432 (see FIG. 11) based on past color chart conditions (the results of the second operational cycle) acquired from the data storage unit 138. The image superimposer 128 newly superimposes the arrow images 424, etc., acquired from the mark image storage unit 124.

The display controller 54 changes the color selection screen image 250 shown in FIG. 10 into the color selection screen image 250 shown in FIG. 11. In the color selection screen image 250 shown in FIG. 11, the present (third operational cycle) color chart conditions are visually displayed on the color bars 254, 256, 258. At the same time, past color chart conditions are displayed together as the arrow images 424, 428, 432 (the results of the second operational cycle) and the arrow images 412, 416, 420 (the results of the first operational cycle).

The arrow images 412, 424, etc., may thus be displayed in a time sequence according to which the color charts 36c are printed. The displayed arrow images 412, 424, etc., allow the operator to grasp the color search history with ease. Therefore, by following the color selection cycles in a time sequence, the operator finds it easy to judge the adequacy of the operational details.

Figure 12:
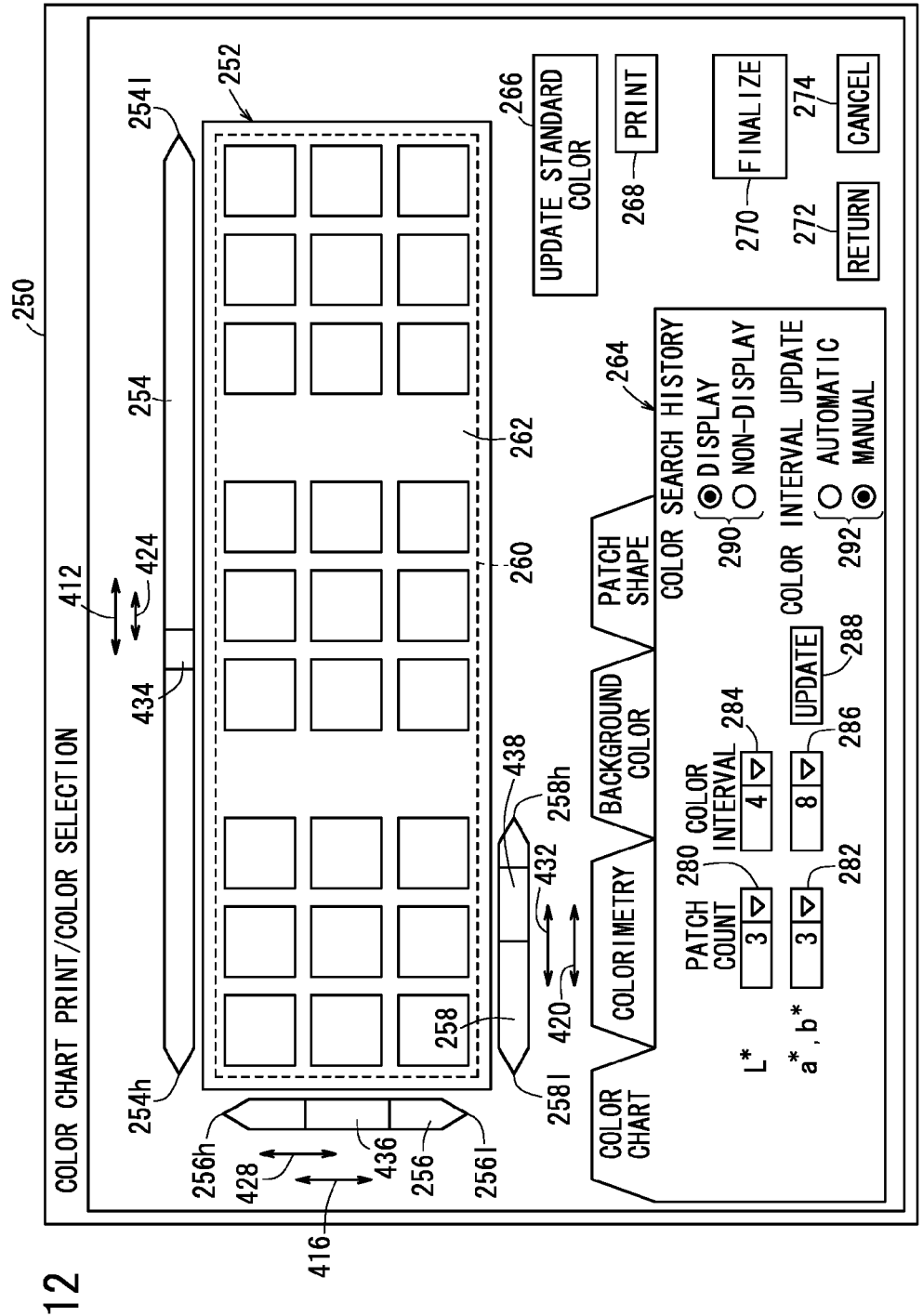
FIG. 12 is a view showing a fourth change of the color selection screen image shown in FIG. 7.

FIG. 12 shows another example of the color selection screen image 250. As shown in FIG. 12, a search range for values of L* has not yet been specified on the color bar 254, in view of the presentation range in the first operational cycle (position and length of the arrow image 412), the presentation range in the second operational cycle (position and length of the arrow image 424), and the presentation range in the third operational cycle (position and length of the mark image 434). Therefore, the operator is capable of recognizing that the color selection process is inadequate by comparing the present presentation range with past presentation ranges.

Alternatively, instead of the operator, the image processing apparatus 16 may judge the adequacy of the operational details based on predetermined judgment standards. If the operational details are judged as being inadequate, then the image processing apparatus 16 may indicate the inadequacy of the operational details using various means. For example, if the warning mark display/non-display determiner 136 shown in FIG. 8 informs the image superimposer 128 that a warning mark needs to be displayed, the display controller 54 displays a color selection screen image 250 including a warning mark on the display device 24. Examples of displayed warning marks include a warning message, a mark displayed in a different color, a mark displayed in a flickering mode, etc.

If the presentation range exceeds color ranges of the color bars 254, 256, 258, then the excessive presentation range may be indicated using various indicating means. Such indicating means are not limited to display means, but may be non-visual means, such as beeping sounds or the like.

In response to such indications, the operator may take various actions, which include performing the color selection process again, or asking another operator (particularly a skilled operator) to perform the color selection process, for example.

Then, the operator prints a color chart 36c and selects a color patch 38 at least once (steps S33 through S38), referring to the auxiliary display for color selection assistance if necessary. If a color is finalized, then control proceeds to the next step S39. Color values of a color patch 38, which has been finally selected (finalized) in steps S31 through S38, correspond to the first color values (selected color values).

Then, the first color value acquirer 102 acquires the selected color values as first color values (step S39). If the operator clicks on the "FINALIZE" button 270 displayed in the color selection screen image 250 (see FIG. 7), the first color value acquirer 102 acquires color chart conditions from the color chart condition input unit 110 via the I/F 68, and also acquires the row number 40 and the column number 42 from the identification information input unit 112. Then, the first color value acquirer 102 calculates and acquires color values (selected color values) depending on the finally selected color patch 38, based on the standard color, the color interval, the color association, the row number 40, and the column number 42.

At the same time, the second color value acquirer 104 acquires color values, which have been entered as a designated color through the input screen image 200 (see FIG. 6), as second color values. The second color values may be either device-dependent data or device-independent data.

Finally, the image processing apparatus 16 corrects colors of the electronic manuscript (step S40).

A first correction process for replacing given color values of the electronic manuscript (print data) with appropriate color values will be described below. After step S39, the color value display data generator 100 acquires first color values and second color values from the color value acquirer 62, and also acquires the profile of the printing machine 18 from the memory 58 or the like. The color value display data generator 100 then generates various data (device-independent data/device-dependent data) for displaying on the display device 24 color information suitable for reproducing colors using the printing machine 18.

Figure 13:
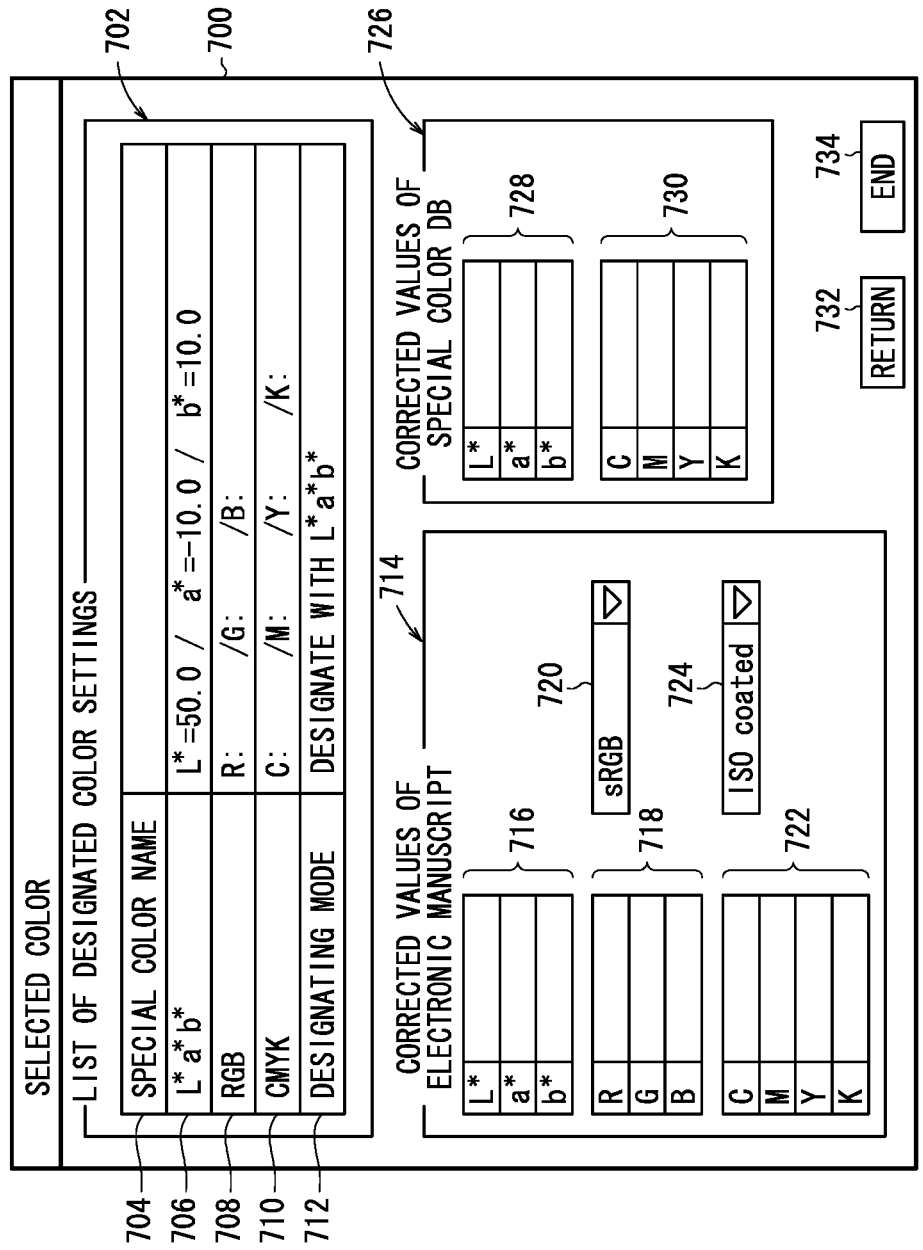
FIG. 13 is a view showing by way of example a selected color screen image that displays a selected color.

Then, the display controller 54 controls the display device 24 to display a selected color screen image 700, which displays a selected color (including the various data discussed above) shown in FIG. 13.

The operator can correct colors of the electronic manuscript while referring to the color information displayed in the selected color screen image 700.

The selected color screen image 700 includes a field 702 in an upper area thereof for displaying color information (including second color values) of the designated color, which has been entered in the input screen image 200 (see FIG. 6).

For example, if a special color name is entered via the pull-down menu 218 shown in FIG. 6, then the entered special color name is displayed in a cell 704 in the field 702. L*, a*, b* values, which correspond to the special color name, are displayed in a cell 706 of the field 702. R, G, B values, which correspond to the special color name, are displayed in a cell 708 of the field 702. C, M, Y, K values, which correspond to the special color name, are displayed in a cell 710 of the field 702. The method of designating color values, i.e., "DESIGNATE WITH SPECIAL COLOR NAME", is displayed in a cell 712 of the field 702.

The selected color screen image 700 includes a field 714 in a lower left area thereof for displaying color values (corrected values of an electronic manuscript) for reproducing the designated color with the printing machine 18.

For example, the first color values (device-independent data), i.e., L*, a*, b* values, are displayed as selected color values in a set of cells 716 of the field 714.

Values produced in a case where the first color values are converted into device-dependent data using a desired profile, i.e., R, G, B values, are displayed in a set of cells 718 of the field 714. In response to selection of a profile via the pull-down menu 208 (see FIG. 6), the color value display data generator 100 converts the first color values into R, G, B values according to an L*a*b*–RGB conversion table included in the profile. The produced R, G, B values are displayed immediately in the set of cells 718 of the field 714. A profile may be selected again using a pull-down menu 720, which is displayed to the right of the cells 718.

Furthermore, values produced in a case where first color values are converted into device-dependent data using a desired profile, i.e., C, M, Y, K values, are displayed in a set of cells 722 of the field 714. In response to selection of a profile via the pull-down menu 212 (see FIG. 6), the color value display data generator 100 converts the first color values into C, M, Y, K values according to an L*a*b*–CMYK conversion table included in the profile. The produced C, M, Y, K values are displayed immediately in the set of cells 722 of the field 714. A profile may be selected again using a pull-down menu 724, which is displayed to the right of the cells 722.

The selected color screen image 700 also includes a field 726 in a lower right area thereof for displaying corrected values of a special color database. First color values (device-independent data), which serve as selected color values, i.e., L*, a*, b* values, are displayed in a set of cells 728 of the selected color screen image 700. Values produced in a case where the second color values are converted into device-dependent data using the profile entered through the pull-down menu 212 (see FIG. 6), i.e., C, M, Y, K values, are displayed in a set of cells 730 of the selected color screen image 700.

The operator acquires any one of the color information items displayed in the selected color screen image 700, and corrects color values of the electronic manuscript using the acquired color information. For example, the operator may have the print data corrector 108 (see FIG. 3), which includes a data editing function, correct the color values of the electronic manuscript.

Management information (L*, a*, b* values or C, M, Y, K values) of the special color database, which is stored in the image processing apparatus 16 or in an apparatus external to the image processing apparatus 16, e.g., the database DB, may be updated manually or automatically to produce the corrected values referred to above. Colors of the print 36 can be adjusted using the updated special color data.

According to a second correction process, a color conversion table included in a profile may be corrected. More specifically, the profile corrector 106 acquires from the color value acquirer 62 the first color values, which are selected and acquired as representing a color that is closest to the designated color, and the second color values representing the color values of the designated color. The profile corrector 106 then corrects the color conversion table in order to adjust the colors, based on differences between the first color values and the second color values, thereby correcting the profile.

Fine adjustment of colors of the print 36 is now completed (step S3).

As described above, the chart simulating image 252, which simulates the layout of the color patches 38 on the color chart 36*c*, is displayed. Color bars 254, 256, 258, which match the tendency of color changes depending on the layout of the color patches 38, also are displayed together with the chart simulating image 252. The mark images 400, 402, 404, which are indicative of the color presentation range according to the color patches 38 in a color space represented by the color bars 254, 256, 258, are displayed together with the color bars 254, 256, 258. Therefore, the operator is able to visually recognize a color search range on the present color chart 36*c*, based on the relative positional relationship between the color bars 254, 256, 258 and the mark images 400, 402, 404. Since the chart simulating image 252, which simulates the color chart 36*c*, also is displayed, the operator can intuitively grasp the color search range, even if the operator is not knowledgeable concerning the art of printing. Consequently, the operator can perform a color adjusting process while confirming the adequacy of present operational details, regardless of the skill of the operator. Stated otherwise, the operator can efficiently select a color that is close to the designated color in a suitable color adjusting process, without wasteful consumption of man hours.

In the illustrated embodiment, the printing machine 18 comprises an inkjet printing apparatus. However, the printing machine 18 that comprises an electrophotographic printer, a thermosensitive printer, or the like may achieve the advantageous effects of the present invention. The output format of the printing machine 18 is not limited to hard copies, but may be soft copies. In other words, the principles of the present invention may be applied to various image display apparatus or to various image display processes.

Although a certain preferred embodiment of the present invention has been shown and described in detail, it should be understood that various changes and modifications may be made to the embodiment without departing from the scope of the invention as set forth in the appended claims.

What is claimed is:

1. A color selection assisting method comprising the steps of determining a standard color, printing a color chart that has a plurality of color patches including neighboring colors of the standard color, and thereafter allowing an operator to select from the color chart at least one of the color patches, which has a color close to a designated color reproduced on a print, the color selection assisting method comprising:

a display step of displaying a chart simulating image, which simulates a layout of the color patches on the color chart; and an auxiliary display step of displaying, together with the chart simulating image, a gradation image that matches tendency of a color change depending on the layout of the color patches, and displaying, together with the gradation image, a mark image, which is indicative of a color presentation range according to the color patches in a color space represented by the gradation image.

2. The color selection assisting method according to claim 1, wherein, if the steps of determining the standard color, printing the color chart, and allowing the operator to select at least one of the color patches that has the color close to the designated color are successively carried out at least once, then the auxiliary display step includes a step of displaying, together with the gradation image, a history mark image, which is indicative of the color presentation range depending on respective color charts that were printed in the past.

3. The color selection assisting method according to claim 2, wherein the auxiliary display step includes a step of displaying history mark images that are indicative of the color presentation range according to a time sequence in which each of the color charts was printed.

4. The color selection assisting method according to claim 1, further comprising:
a display selecting step of making a selection as to whether or not the mark image is to be displayed in the auxiliary display step.

5. The color selection assisting method according to claim 1, wherein the auxiliary display step includes a step of changing and displaying at least one of a size, a color gradient, and a color range of the gradation image depending on the presentation range.

6. The color selection assisting method according to claim 1, further comprising:
a determining step of determining whether or not the presentation range exceeds a color range of the gradation image; and
an indicating step of indicating that the presentation range exceeds the color range of the gradation image, if the presentation range is judged as exceeding the color range of the gradation image.

7. The color selection assisting method according to claim 1, further comprising:
a changing step of changing the number of the color patches on the color chart, or a color interval between the color patches on the color chart; and
the display step includes a step of updating and displaying the chart simulating image depending on the changed number or the changed color interval.

8. The color selection assisting method according to claim 1, wherein the mark image is indicative of at least one of an upper limit value, a lower limit value, and a central value of the presentation range.

9. The color selection assisting method according to claim 1, wherein the gradation image comprise at least three color bars.

10. The color selection assisting method according to claim 1, further comprising:
a color value acquiring step of acquiring a selected color value representing a color value depending on one of the color patches, which is selected as representing a color closest to the designated color.

11. An image processing method comprising:
a printing step of determining a standard color and printing a color chart that has a plurality of color patches including neighboring colors of the standard color;
a display step of displaying a chart simulating image, which simulates a layout of the color patches on the color chart;
an auxiliary display step of displaying, together with the chart simulating image, a gradation image that matches tendency of a color change depending on the layout of the color patches, and displaying, together with the gradation image, a mark image, which is indicative of a color presentation range according to the color patches in a color space represented by the gradation image;
a first color value acquiring step of acquiring, as a first color value, a color value depending on one of the color patches, which is selected as representing a color closest to a designated color reproduced on a print;
a second color value acquiring step of acquiring a color value of the designated color as a second color value; and
a print color adjusting step of adjusting a color of the print, which is printed based on the first color value and the second color value that are acquired.

12. A color selection assisting apparatus for determining a standard color, printing a color chart that has a plurality of color patches including neighboring colors of the standard color, and thereafter allowing an operator to select from the color chart at least one of the color patches, which has a color close to a designated color reproduced on a print, the color selection assisting apparatus comprising:
a simulative image generator for generating a chart simulating image, which simulates a layout of the color patches on the color chart;
a gradation image generator for generating a gradation image, which matches tendency of a color change depending on the layout of the color patches; and
an image superimposer for placing the chart simulating image generated by the simulative image generator and the gradation image generated by the gradation image generator together with each other, and superimposing a mark image, which is indicative of a color presentation range according to the color patches in a color space represented by the gradation image, on the gradation image.

13. The color selection assisting apparatus according to claim 12, further comprising:
a display unit for displaying the chart simulating image, the gradation image, and the mark image that are placed by the image superimposer.

14. The color selection assisting apparatus according to claim 13, further comprising:
a color value acquirer for acquiring a color value of one of the color patches, which is selected as representing a color closest to the designated color, as a selected color value,
wherein the display unit displays color information of the selected color value that is acquired by the color value acquirer.

15. The color selection assisting apparatus according to claim 14, further comprising:
a data converter for converting the selected color value into device-dependent data for a printing machine that prints the print, using a profile of the printing machine,
wherein the display unit displays the device-dependent data produced by the data converter.

16. An image processing apparatus comprising:
a standard color determiner for determining a standard color;
a simulative image generator for generating a chart simulating image, which simulates a layout of a plurality of color patches on a color chart, the color chart having the color patches that include neighboring colors of the standard color determined by the standard color determiner;
a gradation image generator for generating a gradation image that matches tendency of a color change depending on the layout of the color patches;
an image superimposer for placing the chart simulating image generated by the simulative image generator and the gradation image generated by the gradation image generator together with each other, and superimposing a mark image, which is indicative of a color presentation range according to the color patches in a color space represented by the gradation image, on the gradation image;
a first color value acquirer for acquiring, as a first color value, a color value depending on one of the color patches, which is selected as representing a color closest to a designated color reproduced on a print;
a second color value acquirer for acquiring a color value of the designated color as a second color value; and
a print color adjuster for adjusting the color of the print that is printed based on the first color value acquired by the first color value acquirer and the second color value acquired by the second color value acquirer.

17. A non-transitory computer readable recording medium storing therein a program for determining a standard color and allowing an operator to select, from a color chart that has a plurality of color patches including neighboring colors of the standard color, at least one of the color patches, which has a color close to a designated color reproduced on a print, the program enabling a computer to implement the method of:
  generating a chart simulating image, which simulates a layout of the color patches on the color chart;
  generating a gradation image that matches tendency of a color change depending on the layout of the color patches; and
  placing the chart simulating image generator and the gradation image together with each other, and superimposing a mark image, which is indicative of a color presentation range according to the color patches in a color space represented by the gradation image, on the gradation image.

* * * * *